US012744565B2

(12) United States Patent
Yuan et al.

(10) Patent No.: US 12,744,565 B2
(45) Date of Patent: Sep. 22, 2026

(54) PRECODING MATRIX FEEDBACK METHOD, TERMINAL AND NETWORK SIDE DEVICE

(71) Applicant: VIVO MOBILE COMMUNICATION CO., LTD., Dongguan (CN)

(72) Inventors: Jiangwei Yuan, Dongguan (CN); Rakesh Tamrakar, Dongguan (CN); Zhenyuan Song, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 132 days.

(21) Appl. No.: 18/911,663

(22) Filed: Oct. 10, 2024

(65) Prior Publication Data

US 2025/0047339 A1 Feb. 6, 2025

Related U.S. Application Data

(63) Continuation of application No. PCT/CN2023/086945, filed on Apr. 7, 2023.

(30) Foreign Application Priority Data

Apr. 11, 2022 (CN) ........................ 202210374262.9

(51) Int. Cl.
*H04B 7/0456* (2017.01)
*H04B 17/309* (2015.01)

(52) U.S. Cl.
CPC ......... *H04B 7/0456* (2013.01); *H04B 17/309* (2015.01)

(58) Field of Classification Search
CPC .... H04B 7/0456; H04B 17/309; H04B 7/024; H04B 7/048; H04B 7/0639; H04B 17/252
See application file for complete search history.

(56) References Cited

U.S. PATENT DOCUMENTS

2006/0270360 A1* 11/2006 Han .................... H04B 7/0626 370/208
2010/0227562 A1* 9/2010 Shim ................ H04L 25/03993 455/63.1

(Continued)

FOREIGN PATENT DOCUMENTS

CN 112368948 A 2/2021
CN 112751598 A 5/2021

(Continued)

OTHER PUBLICATIONS

Machine translation of WO-2025000402-A1 (Year: 2025).*

(Continued)

*Primary Examiner* — Jean B Corrielus
(74) *Attorney, Agent, or Firm* — The Webb Law Firm

(57) ABSTRACT

A precoding matrix feedback method includes a terminal measures channel reference signals transmitted by a plurality of TRPs. The terminal obtains, based on a channel reference signal measurement result, a precoding matrix jointly transmitted by a plurality of first TRPs, where the first TRPs are TRPs in the plurality of TRPs. The terminal obtains a target codebook coefficient of the precoding matrix, where the target codebook coefficient is used for obtaining or indicating the precoding matrix. The terminal transmits the target codebook coefficient of the precoding matrix to a network-side device.

20 Claims, 5 Drawing Sheets

(56) References Cited

U.S. PATENT DOCUMENTS

| | | | | |
|---|---|---|---|---|
| 2011/0002406 | A1* | 1/2011 | Ming | H04L 25/03343 375/260 |
| 2011/0019755 | A1* | 1/2011 | Lee | H04B 7/024 375/260 |
| 2012/0287799 | A1* | 11/2012 | Chen | H04B 7/0626 370/252 |
| 2014/0064109 | A1* | 3/2014 | Krishnamurthy | H04B 7/0456 370/252 |
| 2021/0013936 | A1* | 1/2021 | Zhu | H04B 7/0628 |
| 2021/0143870 | A1 | 5/2021 | Faxér | |
| 2021/0273692 | A1 | 9/2021 | Gao et al. | |
| 2023/0062132 | A1* | 3/2023 | Wu | H04B 7/024 |
| 2023/0291453 | A1* | 9/2023 | Chou | H04B 7/048 |
| 2023/0319750 | A1* | 10/2023 | Balevi | H04B 17/391 370/329 |
| 2024/0204849 | A1* | 6/2024 | Abebe | H04B 7/024 |

FOREIGN PATENT DOCUMENTS

| | | | |
|---|---|---|---|
| CN | 113746573 | A | 12/2021 |
| WO | 2019019839 | A1 | 1/2019 |

OTHER PUBLICATIONS

Machine translation of CN-114982142-B (Year: 2024).*

Ericsson, “CSI feedback for multi-TRP”, 3GPP TSG-RAN WG1 #90, Prague, Czech Republic, Aug. 21-25, 2017, R1-1714286.

Samsung, “Simulation results for Type II CSI reporting”, 3GPP TSG RAN WG1 NR Meeting #88, Athens, Greece, Feb. 13-17, 2017, R1-1702949.

* cited by examiner 400
401
Measurement module
402
First obtaining module
403
Second obtaining module
404
Feedback module

PRECODING MATRIX FEEDBACK METHOD, TERMINAL AND NETWORK SIDE DEVICE

CROSS-REFERENCE TO RELATED APPLICATIONS

This application is a Bypass Continuation Application of International Patent Application No. PCT/CN2023/086945, filed Apr. 7, 2023, and claims priority to Chinese Patent Application No. 202210374262.9, filed Apr. 11, 2022, the disclosures of which are hereby incorporated by reference in their entireties.

BACKGROUND OF THE INVENTION

Field of the Invention

This application belongs to the technical field of wireless communication, and in particular, to a precoding matrix feedback method, a terminal, and a network-side device.

Description of Related Art

Coordinated multi-point (CoMP) transmission refers to coordinated participation of a plurality of transmission reception points (TRPs) that are geographically separated to transmit data for a terminal or jointly receive data transmitted by a terminal. The plurality of transmission points participating in the coordination generally refer to base stations in different cells. A plurality of base stations in the cells coordinate with each other to use an interference signal as a useful signal, to reduce inter-cell interference and improve a spectrum utilization rate of a system.

SUMMARY OF THE INVENTION

According to a first aspect, a precoding matrix feedback method is provided, including: A terminal measures channel reference signals transmitted by a plurality of TRPs; the terminal obtains, based on a channel reference signal measurement result, a precoding matrix jointly transmitted by a plurality of first TRPs, where the first TRPs are TRPs in the plurality of TRPs; the terminal obtains a target codebook coefficient of the precoding matrix, where the target codebook coefficient is used for obtaining or indicating the precoding matrix; and the terminal transmits the target codebook coefficient of the precoding matrix to a network-side device.

According to a second aspect, a precoding matrix feedback apparatus is provided, including: a measurement module, configured to measure channel reference signals transmitted by a plurality of TRPs; a first obtaining module, configured to obtain, based on a channel reference signal measurement result, a precoding matrix jointly transmitted by a plurality of first TRPs, where the first TRPs are TRPs in the plurality of TRPs; a second obtaining module, configured to obtain a target codebook coefficient of the precoding matrix, where the target codebook coefficient is used for obtaining or indicating the precoding matrix; and a feedback module, configured to transmit the target codebook coefficient of the precoding matrix to a network-side device.

According to a third aspect, a method for obtaining a precoding matrix indicator is provided, including: A network-side device obtains a target codebook coefficient transmitted by a terminal; the network-side device obtains a precoding matrix corresponding to the target codebook coefficient, where the precoding matrix is a precoding matrix jointly transmitted by a plurality of first TRPs; and the network-side device obtains, based on the obtained precoding matrix, a PMI corresponding to each first TRP.

According to a fourth aspect, an apparatus for obtaining a precoding matrix indicator is provided, including: a third obtaining module, configured to obtain a target codebook coefficient transmitted by a terminal; a fourth obtaining module, configured to obtain a precoding matrix corresponding to the target codebook coefficient, where the precoding matrix is a precoding matrix jointly transmitted by a plurality of first TRPs; and a fifth obtaining module, configured to obtain, based on the obtained precoding matrix, a PMI corresponding to each first TRP.

According to a fifth aspect, a terminal is provided. The terminal includes a processor and a memory. The memory stores a program or instructions executable on the processor, and when the program or the instructions are executed by the processor, steps of the method according to the first aspect are implemented.

According to a sixth aspect, a terminal is provided, including a processor and a communication interface. The processor is configured to implement steps of the method according to the first aspect, and the communication interface is configured to communicate with an external device.

According to a seventh aspect, a network-side device is provided. The network-side device includes a processor and a memory. The memory stores a program or instructions executable on the processor, and when the program or the instructions are executed by the processor, steps of the method according to the third aspect are implemented.

According to an eighth aspect, a network-side device is provided, including a processor and a communication interface. The processor is configured to implement steps of the method according to the third aspect, and the communication interface is configured to communicate with an external device.

According to a ninth aspect, a precoding matrix feedback system is provided, including: a terminal and a network-side device, where the terminal may be configured to perform steps of the method according to the first aspect, and the network-side device may be configured to perform steps of the method according to the third aspect.

According to a tenth aspect, a non-transitory readable storage medium is provided. The non-transitory readable storage medium stores a program or instructions, and when the program or the instructions are executed by a processor, steps of the method according to the first aspect are implemented, or steps of the method according to the third aspect are implemented.

According to an eleventh aspect, a chip is provided. The chip includes a processor and a communication interface. The communication interface is coupled to the processor, and the processor is configured to run a program or instructions, to implement steps of the method according to the first aspect, or implement steps of the method according to the third aspect.

According to a twelfth aspect, a computer program/program product is provided. The computer program/program product is stored in a non-transitory storage medium. The computer program/program product is executed by at least one processor, to implement steps of the method according to the first aspect, or implement steps of the method according to the third aspect.

DESCRIPTION OF THE INVENTION

The following clearly describes the technical solutions in embodiments of this application with reference to the accompanying drawings in embodiments of this application. It is clear that the described embodiments are some but not all of embodiments of this application. All other embodiments obtained by a person of ordinary skill in the art based on the embodiments of this application fall within the protection scope of this application.

In the specification and claims of this application, the terms “first”, “second”, and the like are intended to distinguish similar objects, but are unnecessarily used to describe an order or sequence. It should be understood that terms used in such a way are interchangeable in proper circumstances, so that embodiments of this application described herein can be implemented in an order different from the order illustrated or described herein. In addition, the objects distinguished by “first” and “second” are usually one category, and a quantity of objects is not limited. For example, the first object may be one or more. In addition, “and/or” used in this specification and the claims represents at least one of connected objects. The character “/” usually indicates an “or” relationship between associated objects.

It is worth noting that the technology described in embodiments of this application is not limited to being used in a long-term evolution (LTE)/LTE-advanced (LTE-A) system, but may be used in another wireless communication system, for example, a code division multiple access (CDMA) system, a time division multiple access (TDMA) system, a frequency division multiple access (FDMA) system, an orthogonal frequency-division multiple access (OFDMA) system, a single carrier-frequency division multiple access (SC-FDMA) system, and another system. The terms “system” and “network” are often interchangeably used in embodiments of this application, and the technology described may be used for both the system and wireless technology mentioned above, and used for another system and wireless technology. The following description describes a new radio (NR) system for purposes of example, and the term of NR is used in most of the descriptions below, but these technologies are also applicable to an application beyond an NR system application, for example, a 6th generation (6G) communication system.

Figure 1:
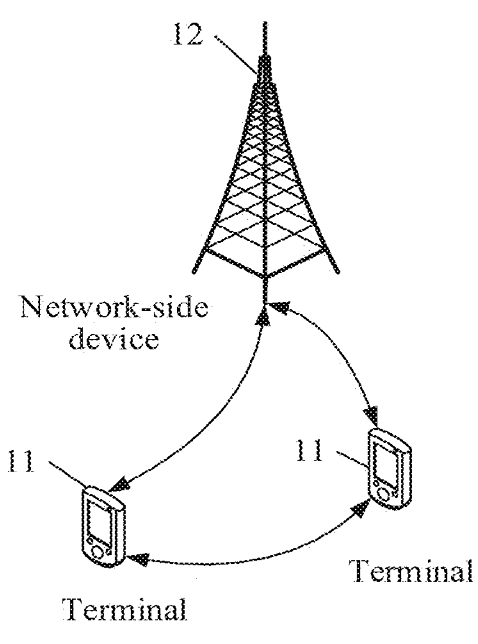
FIG. 1 is a block diagram of a wireless communication system to which an embodiment of this application is applicable.

FIG. 1 is a block diagram of a wireless communication system to which an embodiment of this application is applicable. The wireless communication system includes a terminal 11 and a network-side device 12. The terminal 11 may be a mobile phone, a tablet computer, a laptop computer or a notebook computer, a personal digital assistant (PDA), a palmtop computer, a netbook, an ultra-mobile personal computer (UMPC), a mobile internet device (MID), an augmented reality (AR)/virtual reality (VR) device, a robot, a wearable device, an in-vehicle device (VUE), a pedestrian terminal (PUE), a smart home (home devices with a wireless communication function, such as a refrigerator, a television, a washing machine, or furniture), a game console, a personal computer (PC), a teller machine, a self-service machine, or another terminal-side device. The wearable device includes: a smart watch, a smart band, smart headphones, smart glasses, smart jewelry (a smart bangle, a smart bracelet, a smart ring, a smart necklace, a smart ankle bracelet, a smart anklet, and the like), a smart wristband, smart clothing, and the like. It should be noted that, a type of the terminal 11 is not limited in embodiments of this application. The network-side device 12 may include an access network device and/or a core network device. The access network device may alternatively be referred to as a radio access network device, a radio access network (RAN), a radio access network function, or a radio access network element. The access network device may include a base station, a wireless local area network (WLAN) access point, a wireless fidelity (Wi-Fi) node, or the like. The base station may be referred to as a NodeB, an evolved NodeB (eNB), an access point, a base transceiver station (BTS), a radio base station, a radio transceiver, a basic service set (BSS), an extended service set (ESS), a home NodeB, a home evolved NodeB, a transmission reception point (TRP), or another proper term in the art. As long as the same technical effect is achieved, the base station is not limited to a technical vocabulary. It needs to be noted that, only a base station in an NR system is used as an example in embodiments of this application, and a type of the base station is not limited.

Common CoMP schemes may each be classified into one of the following categories: Joint processing (JP) or coordinated scheduling (CS)/coordinated beamforming (CB).

Joint processing (JP) means that data of one terminal (UE) is available on more than one time-frequency resource in one CoMP coordination set, including:

(1) Joint transmission (JT). For example, data is simultaneously transmitted from a plurality of points (a part of the CoMP coordination set or the entire CoMP coordination set) to one UE or a plurality of UEs on one time-frequency resource. Alternatively, data is simultaneously transmitted from a plurality of points to one UE, for example, to (coherently or non-coherently) improve received signal quality and/or a data throughput.

(2) Dynamic point selection (DPS)/Frequency modulation. Data is transmitted from one point (in one CoMP coordination set) on one time-frequency resource. The transmission/mixing point may be changed from one subframe to another subframe, including a change in an RB pair within one subframe. Data is simultaneously available at a plurality of points. Dynamic point selection/Frequency modulation may include dynamic cell selection (DCS).

(3) DPS and JT. In this case, a plurality of points may be selected on a time-frequency resources for data transmission. Coordinated scheduling/beamforming (CS/CB) means that for one time-frequency resource, UE data is available at only one point in a CoMP coordination set and is transmitted from the point (Downlink (DL) data is transmitted from the point), but user scheduling/beamforming decisions are coordinated among points corresponding to the CoMP coordination set. The selection of the transmission point is semi-static, that is, a semi-static selection point (SSPS) is used. In other words, transmission is performed each time from a point to a specific UE, and the transmission point can only be changed in a semi-static manner.

Usually, a R16 TypeII codebook is designed in a beam combination principle. Considering a problem of feedback overheads of a precoding matrix indicator (PMI), frequency-domain compression is added to the R16 TypeII codebook design, a highest supported rank number is increased to 4, and a distribution of non-zero coefficients that indicate the PMI feedback in a bitmap manner is added.

Generation of a codebook at each layer may be represented by the following formula:

$$W = W_1 \tilde{W}_2 W_f^H,$$

where $$W_1 = \begin{bmatrix} v_0 v_1 \dots v_{L-1} & 0 \\ 0 & v_0 v_1 \dots v_{L-1} \end{bmatrix}$$

and $v_i$, i∈{0, 1, . . . , L−1} represents DFT beam vectors in a dimension of $N_1N_2\times1$; and $$\tilde{W}_2 = \begin{bmatrix} p_0^{(1)} & \dots & 0 \\ \vdots & \ddots & \vdots \\ 0 & \dots & p_{2L-1}^{(1)} \end{bmatrix} \begin{bmatrix} p_{0,0}^{(2)}\varphi_{0,0} & \dots & p_{0,Mv-1}^{(2)}\varphi_{0,Mv-1} \\ \vdots & \ddots & \vdots \\ p_{2L-1,0}^{(2)}\varphi_{2L-1,0} & \dots & p_{2L-1,Mv-1}^{(2)}\varphi_{2L-1,Mv-1} \end{bmatrix},$$

where values of $$p_i^{(1)}, i \in \{0, 1, \dots, L-1\}$$

are the same, and are amplitude coefficients in a polarization direction r=0; values of $$p_i^{(1)}, i \in \{L, L+1, \dots, 2L-1\}$$

are the same, and are amplitude coefficients in a polarization direction r=1;

$$P_{i,m}^{(2)}$$

and $\varphi_{i,m}$ are an amplitude coefficient and a phase coefficient corresponding to a beam i with a tap m; and $W_f$=

$$[f_0 f_1 \dots f_{Mv-1}]$$

and $$f_i, i \in \{0, 1, \dots, Mv-1\}$$

represents DFT vectors in a dimension of $1\times N_3$.

The terminal may feed back, in a PMI, codebook coefficients for obtaining or indicating $W_1$, $\tilde{W}_2$ and $W_f$, and the network-side device may obtain, based on the PMI fed back by the terminal, $W_1$, $\tilde{W}_2$, and $W_f$.

(1) For $W_1$

Calculate L beam vectors $$v_{m_1^{(i)},m_2^{(i)}}, i = 0, 1, \dots, L-1$$

based on $i_{1,1}$ and $i_{1,2}$ in the PMI. A confirmation manner of beam vectors and subscripts $$m_1^{(i)}, m_2^{(i)}$$

is:

$$u_m = \begin{cases} \begin{bmatrix} 1 & e^{j\frac{2\pi m}{O_2N_2}} & \dots & e^{j\frac{2\pi m(N_2-1)}{O_2N_2}} \end{bmatrix} & N_2 > 1 \\ 1 & N_2 = 1 \end{cases}$$

$$v_{l,m} = \begin{bmatrix} u_m & e^{j\frac{2\pi l}{O_1N_1}} u_m & \dots & e^{j\frac{2\pi l(N_1-1)}{O_1N_1}} u_m \end{bmatrix}^T$$

$$m_1^{(i)} = O_1 n_1^{(i)} + q_1$$

$$m_2^{(i)} = O_2 n_2^{(i)} + q_2,$$

where $[q_1, q_2]$ is obtained based on $i_{1,1}$ in the PMI, and the calculation manner is:

$$i_{1,1} = [q_1 \ \ q_2]$$

$$q_1 \in \{0, 1, \dots, O_1 - 1\}$$

$$q_2 \in \{0, 1, \dots, O_2 - 1\},$$

where $[n_1, n_2]$ is obtained based on $i_{1,2}$ in the PMI.

(2) For $\tilde{W}_2$ (1) Calculate an Amplitude of a Strongest Coefficient

The strongest coefficient in each polarization direction at a layer l is expressed as $$p_l^{(1)} = [p_{l,0}^{(1)} \ \ p_{l,1}^{(1)}],$$

where a stronger coefficient is quantized to 1. Therefore, there is no need to report. A next stronger coefficient is represented by a PMI $i_{2,3,l}$, where $$i_{2,3,l} = [k_{l,p}^{(1)}], p \in \{0, 1\},$$

and a mapping rule between $$k_{l,p}^{(1)}$$

to $$p_{l,p}^{(1)}$$

is shown in Table 1.

TABLE 1

| $k_{l,p}^{(1)}$ | $p_{l,p}^{(1)}$ |
|---|---|
| 0 | Reserved |
| 1 | $\frac{1}{\sqrt{128}}$ |
| 2 | $\left(\frac{1}{8192}\right)^{1/4}$ |
| 3 | $\frac{1}{8}$ |
| 4 | $\left(\frac{1}{2048}\right)^{1/4}$ |
| 5 | $\frac{1}{2\sqrt{8}}$ |
| 6 | $\left(\frac{1}{512}\right)^{1/4}$ |
| 7 | $\frac{1}{4}$ |
| 8 | $\left(\frac{1}{128}\right)^{1/4}$ |
| 9 | $\frac{1}{\sqrt{8}}$ |
| 10 | $\left(\frac{1}{32}\right)^{1/4}$ |
| 11 | $\frac{1}{2}$ |
| 12 | $\left(\frac{1}{8}\right)^{1/4}$ |
| 13 | $\frac{1}{\sqrt{2}}$ |
| 14 | $\left(\frac{1}{2}\right)^{1/4}$ |
| 15 | 1 |

(2) Calculate an Amplitude and a Phase of Each Tap

An amplitude coefficient of each tap at a layer 1 is expressed as:

$$p_l^{(2)} = \left[\, p_{l,0}^{(2)} \;\; \ldots \;\; p_{l,M_v-1}^{(2)} \,\right]$$

$$p_{l,f}^{(2)} = \left[\, p_{l,0,f}^{(2)} \;\; \ldots \;\; p_{l,2L-1,f}^{(2)} \,\right]$$

According to a PMI $i_{2,4,l}$, a value is expressed as follows:

$$i_{2,4,l} = \left[\, k_{l,0}^{(2)} \;\; \ldots \;\; k_{l,M_v-1}^{(2)} \,\right]$$

$$k_{l,f}^{(2)} = \left[\, k_{l,0,f}^{(2)} \;\; \ldots \;\; k_{l,2L-1,f}^{(2)} \,\right]$$

$$k_{l,i,f}^{(2)} \in \{0, \ldots, 7\}$$

A mapping rule of $$k_{l,p}^{(1)}$$

to $$p_{l,p}^{(1)}$$

is shown in Table 2.

TABLE 2

| $k_{l,i,f}^{(2)}$ | $p_{l,i,f}^{(2)}$ |
|---|---|
| 0 | $\frac{1}{8\sqrt{2}}$ |
| 1 | $\frac{1}{8}$ |
| 2 | $\frac{1}{4\sqrt{2}}$ |
| 3 | $\frac{1}{4}$ |
| 4 | $\frac{1}{2\sqrt{2}}$ |
| 5 | $\frac{1}{2}$ |
| 6 | $\frac{1}{\sqrt{2}}$ |
| 7 | 1 |

Each tap phase at a layer l is quantized by 16 PSK, and a coefficient is expressed as:

$$\varphi_{l,i,f} = e^{j\frac{2\pi c_{l,i,f}}{16}},$$

where the coefficient is indicated by a PMI $$i_{2,5,l}=\left[c_{l,0}\ \ldots\ c_{l,M_v-1}\right],$$

where $$c_{l,f}=[c_{l,0,f}\ \ldots\ c_{l,2L-1,f}],\ c_{l,i,f}\in\{0,\ \ldots\ ,15\}.$$

$i_{2,4,l}$ and $i_{2,5,l}$ are only an amplitude and a phase of a non-zero and non-strongest coefficient at a feedback layer l, where a distribution of the non-zero coefficient is indicated by $i_{1,7,l}$ in a bitmap manner. For a coefficient of $$k_{l,i,f}^{(3)}=0,$$

both the amplitude and the phase are set to 0.

$$i_{1,7,l}=\left[\,k_{l,0}^{(3)}\ \ldots\ k_{l,M_v-1}^{(3)}\,\right]$$

$$k_{l,f}^{(2)}=\left[\,k_{l,0,f}^{(3)}\ \ldots\ k_{l,2L-1,f}^{(3)}\,\right]$$

$$k_{l,i,f}^{(3)}\in\{0,1\}$$

A beam index corresponding to the strongest coefficient is $$i_l^*,$$

and may be obtained by performing calculation on $i_{1,8,l}$, and the formula is:

$$i_{1,8,l}=\begin{cases}\sum_{i=0}^{i_1^*}k_{1,i,0}^{(3)}-1 & v=1\\ i_l^* & 1<v\le 4\end{cases}$$

That is, for rank=1, $i_{1,8,l}$ indicates that the strongest beam is a beam corresponding to an $$i_l^{*th}$$

non-zero coefficient, and for rank>1, $i_{1,8,l}$ indicates that the strongest beam is an $$i_l^{*th}$$

beam.

In a process of calculating a codebook, UE performs remapping on each tap based on a tap index $$f_l^*$$

of the strongest coefficient, and a mapped strongest tap index $$f_l^*$$

becomes 0. In this way, because a position of the strongest coefficient is known, an amplitude index is $$k_{l,i_l^*,0}^{(2)}=7,$$

and a phase coefficient $$c_{l,i_l^*,0}=0$$

known, feedback of the UE is not required.

(3) For $$W_f^H$$

$$W_f^H$$

includes Mv DFT vectors, where $$M_v=\left\lceil p_v\frac{N_3}{R}\right\rceil,$$

and may be represented as $$W_f^H=\left[y_{t,l}^{(0)}\,y_{t,l}^{(1)}\ \ldots\ y_{t,l}^{(M_v-1)}\right]^T$$

and t={0,1, . . . , $N_3$−1}, where $N_3$ is a quantity of PMI subbands, that is, a total quantity of taps, and $M_v$ represents a quantity of taps reserved, and a calculation formula of $$y_{t,l}^{(f)},\ f=\{0,1,\ \ldots\ ,M_v-1\}$$

is:

$$y_{t,l}^{(f)}=e^{j\frac{2\pi t n_{3,l}^{(f)}}{N_3}}$$

$$n_{3,l}^{(f)}\in\{0,1,\ \ldots\ ,N_3-1\},$$

where $$n_{3,l}^{(f)}$$

is $M_v$ tap indexes obtained by the UE through remapping, and a remapping rule is:

$$n_{3,l}^{(f)} = \left(n_{3,l}^{(f)} - n_{3,l}^{(f_l^*)}\right) \bmod N_3$$

$$f = (f - f_l^*) \bmod M_v,$$

where $$f_l^*$$

is the tap index of the strongest coefficient, and it can be learned of $$n_{3,l}^{(f_l^*)} = 0$$

after remapping.

When $$N_3 \leq 19,\ n_{3,l}^{(1)},\ \ldots\ ,\ n_{3,l}^{(M_v-1)}$$

is obtained by $i_{1,6,l}$ in the PMI indices, and if $M_v=1$, $i_{1,6,l}=0$, no feedback is required.

When $$N_3 > 19,\ n_{3,l}^{(1)},\ \ldots\ ,\ n_{3,l}^{(M_v-1)}$$

is obtained by $i_{1,6,l}$ in the PMI indices and $M_{initial}$. In this case, only non-zero $$n_{3,l}^{(f)}$$

is fed back, where $$M_{initial} \in \{-2M_v + 1,\ -2M_v + 2,\ \ldots\ ,\ 0\}$$

may be obtained by $i_{1,5}$ (note: layercommon).

$$i_{1,5} = \begin{cases} M_{initial} & M_{initial} = 0 \\ M_{initial} + 2M_v & M_{initial} < 0 \end{cases}$$

A process of obtaining $i_{1,6,l}$ and obtaining $$n_{3,l}^{(f)}$$

is the same as that of obtaining a beam number $W_1$, and are all obtained by using a combination number. For $$n_{3,l}^{(f)}$$

greater than $$M_{initial} + N3 - 1,\ n_{3,l}^{(f)}$$

is first mapped to 0, 1, . . . , $2M_v-1$, and then a combination number is calculated.

However, only one TRP is considered in the current $W_1$. For JT transmission, $W_1$ in the foregoing Type2 codebook design, only one TRP is considered, and therefore only one group of orthogonal DFT vectors are included. If there is a design of a plurality of TRPs, since each TRP has an independent angle domain, there may be a performance loss if $W_1$ in the current design is still used. A precoding matrix feedback method in the current technology is not applicable to a scenario in which a plurality of TRPs are used for coordinated transmission.

The precoding matrix feedback solution provided in embodiments of this application is described in detail below by using some embodiments and application scenarios thereof with reference to the accompanying drawings.

Figure 2:
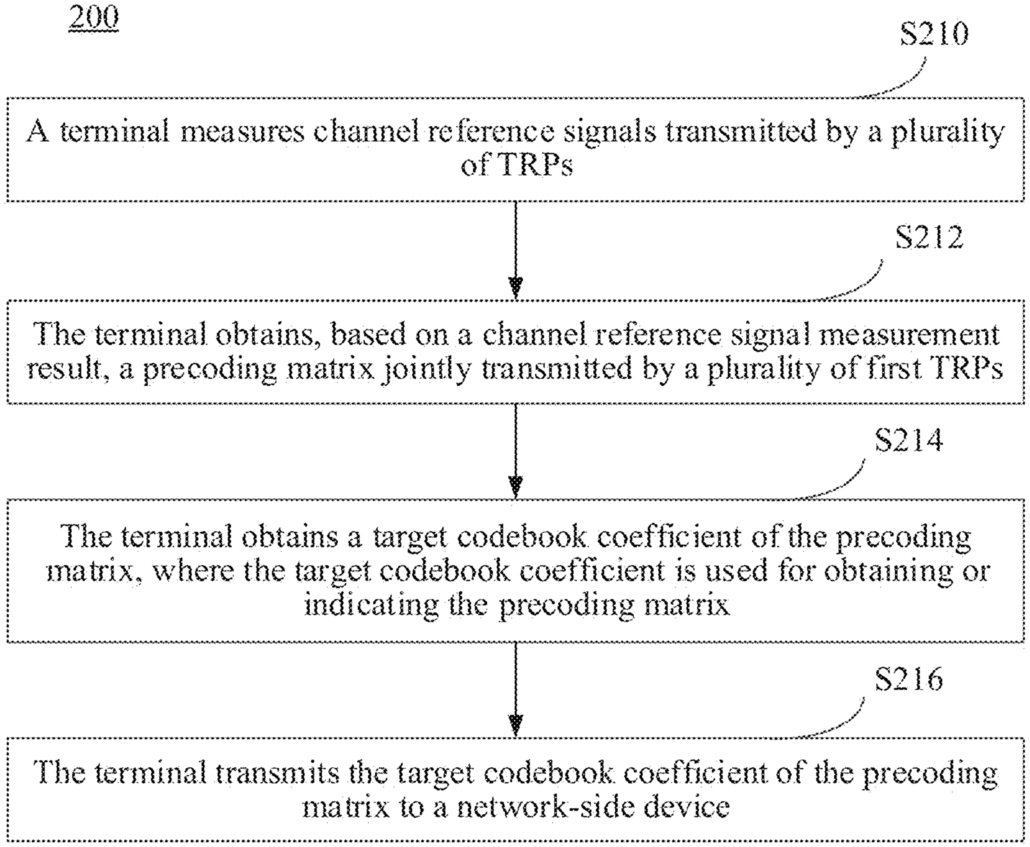
FIG. 2 is a schematic flowchart of a precoding matrix feedback method according to an embodiment of this application.

FIG. 2 is a schematic flowchart of a precoding matrix feedback method according to an embodiment of this application. The method 200 may be performed by a terminal. In other words, the method may be performed by software or hardware installed on the terminal. As shown in FIG. 2, the method may include the following steps.

S210: The terminal measures channel reference signals transmitted by a plurality of TRPs.

In this embodiment of this application, the terminal may measure the channel reference signals transmitted by the plurality of TRPs, to obtain channel information corresponding to each TRP.

One TRP may transmit at least one channel reference signal, and the terminal may obtain channel information corresponding to the TRP by measuring the at least one channel reference signal transmitted by the TRP.

The terminal may determine the measured channel reference signal based on a configuration of a network-side device. For example, the network-side device may configure the to-be-measured channel reference signal for the UE through a multiple transmission reception point (MTRP) channel state information (CSI) report configuration.

S212: The terminal obtains, based on a channel reference signal measurement result, a precoding matrix jointly transmitted by a plurality of first TRPs, where the first TRPs are TRPs in the plurality of TRPs.

In this embodiment of this application, the plurality of first TRPs may be all of the plurality of TRPs, or some of the plurality of TRPs. For example, the terminal may select, based on a reference signal received power (RSRP) measurement result, channel information of some of the plurality of TRPs based on an RSRP threshold configured by the network side, to obtain the precoding matrix. For example, the terminal may select, based on the channel measurement result, information of some of the plurality of TRPs by the terminal.

For example, the precoding matrix may be formed by three levels of codebooks $$W = W_1 \tilde{W}_2 W_f^H.$$

$W_1$ may be formed by block diagonalization of 2L beam complex vectors (including but not limited to discrete fourier transform (DFT) vectors) of T first TRPs, where L is a quantity of polarized ports corresponding to one first TRP.

In a first possible implementation, $$W_1 = \begin{bmatrix} V_0 & \dots & 0 \\ 0 & \dots & 0 \\ 0 & \dots & V_{T-1} \end{bmatrix} \text{ and } V_t = \begin{bmatrix} v_0 v_1 \dots v_{L-1} & 0 \\ 0 & v_0 v_1 \dots v_{L-1} \end{bmatrix}.$$

$t \in \{0, 1, \ldots, T-1\}$; $v_i$, $i \in \{0, 1, \ldots, L-1\}$ represents a two-dimensional beam complex vector in a dimension of $$N_1^t N_2^t \times 1, \text{ and } N_1^t N_2^t$$

represents a quantity of ports of a specific polarization of the first TRP.

Optionally, $$N_1^t$$

and $$N_2^t$$

may be indicated to the terminal by the network-side device. If a quantity of ports of each TRP is the same, the network-side device may indicate only a set of values of $N_1$ and $N_2$, and the terminal obtains a quantity of ports of all TRPs based on a product.

In a second possible implementation, $$W_1 = \begin{bmatrix} B_0 & 0 \\ 0 & B_1 \end{bmatrix},$$

where $B_0$ represents a beam matrix in a first polarization direction, $B_1$ represents a beam matrix in a second polarization direction, $$B_p = \begin{bmatrix} v_0^0 v_1^0 \dots v_{L-1}^0 & \dots & 0 \\ 0 & \dots & 0 \\ 0 & \dots & v_0^{T-1} v_1^{T-1} \dots v_{L-1}^{T-1} \end{bmatrix}, p \in \{0, 1\};$$

$$v_i^t, i \in \{0, 1, \dots, L-1\}, t \in \{0, 1, \dots, T-1\}$$

represents a two-dimensional beam complex vector that is associated to a dimension of $N_1N_2 \times 1$ of a $t^{th}$ first TRP, and $N_1N_2$ represents a quantity of ports of a specific polarization of one first TRP.

In a third possible implementation, $$W_1 = \begin{bmatrix} B_0 & 0 \\ 0 & B_1 \end{bmatrix}, \text{ where } B_p = \begin{bmatrix} v_0^0 v_1^0 \dots v_{L-1}^0 \\ v_0^{T-1} v_1^{T-1} \dots v_{L-1}^{T-1} \end{bmatrix},$$

$$p \in \{0, 1\}; v_i^t, i \in \{0, 1, \dots, L-1\}, t \in \{0, 1, \dots, T-1\}$$

represents a two-dimensional beam complex vector that is associated to a dimension of $N_1N_2 \times 1$ of a $t^{th}$ first TRP, and $N_1N_2$ represents a quantity of ports of a specific polarization of one first TRP.

If $W_1$ is used in the first possible implementation or the second possible implementation, $\tilde{W}_2$ may be formed by $2LT*M_v$ coefficients, and for the third possible implementation, $\tilde{W}_2$ may be formed by $2L*M_v$ coefficients.

$W_f$ may be formed by $M_v$ beam complex vectors.

S214: The terminal obtains a target codebook coefficient of the precoding matrix, where the target codebook coefficient is used for obtaining or indicating the precoding matrix.

S216: The terminal transmits the target codebook coefficient of the precoding matrix to a network-side device.

In other words, the terminal feeds back the precoding matrix by feeding back the target codebook coefficient to the network-side device.

In this embodiment of this application, the terminal may feed back the target codebook coefficient by using a channel state information (CSI) report, for example, feed back the target codebook coefficient by using a multi-TRP (MTRP) CSI report.

In a possible implementation, the network side may configure an RSRP (reference signal received power) threshold or gap, and the terminal selects some TRPs as the first TRPs based on the threshold or gap. The terminal may select the plurality of first TRPs from the plurality of TRPs based on the RSRP threshold configured by the network-side device.

For example, the network configures 4 measurement resources from 4 TRPs for obtaining JT channel state information (CSI), and configures the RSRP threshold or gap to 10 dB. The terminal measures RSRPs of the four measurement resources, and selects a strongest RSRP. If an RSRP of a measurement resource corresponding to a specific TRP is less than a value of the strongest RSRP minus the threshold, the terminal does not recommend the TRP for JT transmission, and the corresponding TRP is not included in the first TRP.

Optionally, the MTRP CSI report including the JT CSI transmitted by the terminal may further include: target indication information, used for indicating the first TRP corresponding to the JT CSI.

The target indication information may be carried in at least one of the following:

(1) A target domain of the MTRP CSI report, where the target domain represents a CSI-reference signal resource indicator (CRI). That is, the MTRP CSI report includes one CRI, and the CRI is used for indicating a mapping between a first CSI and a JT transmission measurement hypothesis.

For example, the network-side device configures JT transmission measurement hypotheses of 4 TRPs, and the terminal selects three of the TRPs based on an RSRP threshold configured by the network. In this case, the CSI report includes CRI codepoints corresponding to the three TRPs. In this case, all CRI codepoints include all possible combinations of TRPs.

(2) A target bit sequence included in the MTRP CSI report, where the target bit sequence represents a selected TRP combination in the MTRP CSI report.

For example, the network-side device configures JT transmission measurement hypotheses of 4 TRPs, and the terminal selects three of the TRPs (a first TRP, a second TRP, and a third TRP) based on an RSRP threshold configured by the network. In this case, the MTRP CSI report includes a bit sequence with a target length of 4, where a first bit corresponds to the first TRP, a second bit corresponds to the second TRP, a third bit corresponds to the third TRP, and a fourth bit corresponds to the fourth TRP. Therefore, if the bit sequence fed back by the terminal is 1110, the JT CSI fed back by the terminal is obtained through measurement on reference signals of the first TRP, the second TRP, and the third TRP.

Optionally, the network-side device may further indicate whether to allow the terminal to select the best N TRPs to obtain the JT CSI and perform feedback. For example, the network-side device may associate or include one higher layer signaling in a CSI report setting associated with the JT CSI, where the higher layer signaling is used for indicating whether to allow the terminal to select the best N first TRPs to obtain the JT CSI and perform feedback.

For example, the network configures that 4 resources correspond to 4 TRPs. If the network indicates that the TRP may be selected by using the higher layer signaling, the terminal may select the TRP, and the corresponding JT CSI corresponds to the selected TRP. For example, the fed-back target codebook coefficient is a target codebook coefficient corresponding to the selected TRP. If the network indicates, by using the higher layer signaling, that the UE cannot select the TRP or does not configure a signaling related to TRP selection, the terminal feeds back the JT CSI corresponding to all TRPs. For example, the fed-back target codebook coefficient is a target codebook coefficient corresponding to a plurality of configured TRPs.

In a possible implementation, the target codebook coefficient may include:

(1) a first codebook coefficient, where the first codebook coefficient is used for obtaining or indicating beam complex vectors corresponding to the plurality of first TRPs;

(2) a second codebook coefficient, where the second codebook coefficient is used for obtaining or indicating a projection coefficient of the precoding matrix; and (3) a third codebook coefficient, where the third codebook coefficient is used for obtaining or indicating a first predetermined quantity of complex vectors of the precoding matrix.

Optionally, the first codebook coefficient includes: $\check{T}$ first coefficients and $\check{T}$ second coefficients, where $\check{T}$ is a quantity of TRPs included in the plurality of first TRPs, an i-th first coefficient indicates a number of an orthogonal beam group corresponding to an i-th first TRP, and an i-th second coefficient indicates numbers of a predetermined quantity of beams in the orthogonal beam group corresponding to the i-th first TRP, where i=1, 2, . . . , $\check{T}$.

For example, if $$W = W_1 \tilde{W}_2 W_f^H,$$

for the first codebook $W_1$, the terminal may use a feedback coefficient $i_{1,1,t}$ and coefficient $i_{1,2,t}$, where t=0, 1, . . . , $\check{T}-1$ indicates, to the network-side device, beam complex vectors corresponding to $\check{T}$ first TRPs selected by the terminal, and the network-side device obtains the beam complex vectors by using the fed-back coefficients, to obtain the first codebook. For a specific value of t, $i_{1,1,t}$ is used for indicating a number of an orthogonal DFT beam group, and $i_{1,2,t}$ is used for indicating numbers of a specific quantity of beams selected in the orthogonal beam group.

Optionally, for t, t=0 is associated with a first valid measurement signal resource port group, t=1 is associated with a second valid measurement signal resource port group, and so on. Alternatively, t=0 is associated with a first valid measurement signal resource, t=1 is associated with a second valid measurement signal resource, and so on. Each measurement signal resource port group or each measurement signal resource corresponds to one TRP. The valid measurement signal resource port group or the valid measurement signal resource may be all measurement signal resource port groups or measurement signal resources associated with the JT CSI that is fed back and that is determined by the terminal. In other words, if a resource port group or a resource is not associated with the JT CSI fed back by the terminal, the resource port group or the resource is not a valid resource port group or a valid resource. An order of all valid measurement resource port groups or measurement resources may be sequentially sorted based on an order of resources or resource port groups configured by the network or based on a size of a resource ID or a resource port group ID. When the terminal performs feedback, an order of the feedback may be in descending order of t. In other words, a smaller value of t indicates a higher feedback or mapping priority. For example, the network-side device may configure a plurality of measurement signal resource port groups or measurement signal resources for the terminal. The plurality of TRPs may separately transmit the channel reference signals by using one of the measurement signal resource port groups or measurement signal resources. The terminal may measure the channel reference signals on each measurement signal resource port group or measurement signal resource, to obtain a beam complex vector corresponding to a corresponding TRP.

In a possible implementation, the first codebook coefficient further includes: first indication information, where the first indication information indicates that the terminal does not recommend to use at least one second TRP for coordinated transmission, and the second TRP is a TRP other than the plurality of first TRPs in the plurality of TRPs. In the possible implementation, the terminal may select, based on the measurement result, some TRPs (that is, a plurality of first TRPs) from the plurality of TRPs. The terminal may not recommend, for a reason (for example, poor channel quality), the network side to use other TRPs to perform coordinated transmission to the terminal. Therefore, the first indication information may be included in the first codebook coefficient, and the first indication information indicates the network-side device that the terminal does not recommend to use at least one second TRP for coordinated transmission.

In a possible implementation, the first indication information may include: N first coefficients and N second coefficients, where N is a quantity of TRPs included in the at least one second TRP, a value of a first coefficient corresponding to a j-th second TRP is a first predetermined value, and a value of a second coefficient corresponding to the j-th second TRP is a second predetermined value, where j=1, 2, . . . , N. The first predetermined value and the second predetermined value may be any value agreed in advance on the network side, for example, 0.

Alternatively, in another possible implementation, the first indication information may include: identification information of the at least one second TRP. In other words, the terminal indicates, by feeding back the identification information of the second TRP, that the terminal does not recommend the network side to use the TRPs for coordinated transmission to the terminal.

Alternatively, in still another possible implementation, the terminal may indicate, by not feeding back a first coefficient and a second coefficient corresponding to the at least one second TRP, that the terminal does not recommend the network side to use the TRPs for coordinated transmission to the terminal. In other words, in the possible implementation, the first codebook coefficient is further used for indicating that the terminal recommends to use the plurality of first TRPs for coordinated transmission.

In other words, in one or more possible implementations, the terminal may indicate, by not feeding back a coefficient $i_{1,1,t}$ and a coefficient $i_{1,2,t}$ corresponding to one or some t values or by feeding back specific values (for example, $i_{1,1,t}$ and/or $i_{1,2,t}$ is 0) to a coefficient $i_{1,1,t}$ and a coefficient $i_{1,2,t}$ corresponding to one or some t values, a TRP that is not recommended by the terminal (that is, a TRP corresponding to a port group or resource corresponding to one or some t values is not recommended) to the network. In this case, t=0, 1, . . . , T−1, and T is a quantity of port groups or a quantity of resources associated with one piece of JT CSI configured by the network.

For example, in a case that T=4, the terminal feeds back $i_{1,1,0}$, $i_{1,1,1}$, $i_{1,1,2}$, $i_{1,1,3}$ and $i_{1,2,0}$, $i_{1,2,1}$, $i_{1,2,2}$, $i_{1,2,3}$ to indicate the network to obtain W1. If a network higher layer signaling indicates that the terminal may perform TRP selection, the terminal may set $i_{1,1,2}$, $i_{1,1,3}$ and $i_{1,2,2}$, $i_{1,2,3}$ corresponding to a corresponding port group or resource with poor quality to 0 for feedback, and the network-side device receives $i_{1,1,t}$, $i_{1,2,t}$ of all 0s. In this case, it indicates that the terminal does not recommend the associated TRP for transmission or that the terminal considers that the channel quality of the associated TRP is poor.

For example, in a case that T=4, the terminal feeds back $i_{1,1,0}$, $i_{1,1,1}$, $i_{1,1,2}$, $i_{1,1,3}$ and $i_{1,2,0}$, $i_{1,2,1}$, $i_{1,2,2}$, $i_{1,2,3}$ to indicate the network to obtain W1. If a network higher layer signaling indicates that the terminal may perform TRP selection, the terminal may set $i_{1,2,2}$, $i_{1,2,3}$ corresponding to a corresponding port group or resource with poor quality to 0 for feedback, and the network-side device receives $i_{1,2,t}$ of all 0s. In this case, it indicates that the terminal does not recommend the associated TRP for transmission or that the terminal considers that the channel quality of the associated TRP is poor.

In a possible implementation, the second codebook coefficient may include at least one of the following:

(1) A plurality of third coefficients, where each of the plurality of third coefficients is used for indicating positions and a quantity of non-zero coefficients of the plurality of first TRPs at a corresponding layer. In other words, each third coefficient is used for indicating positions and a quantity of non-zero coefficients of the plurality of first TRPs at one layer. For example, if there are three layers, the second codebook coefficient may include three third coefficients, each third coefficient corresponds to one layer, and each third coefficient is used for indicating positions and a quantity of non-zero coefficients of the plurality of first TRPs at a corresponding layer. Alternatively, each of the plurality of third coefficients is used for indicating positions and a quantity of non-zero coefficients at one layer of the corresponding first TRP. In other words, each third coefficient corresponds to a layer of one first TRP and is used for indicating positions and a quantity of non-zero coefficients of the first TRP at the layer. For example, if there are three layers and a quantity of the plurality of first TRPs is two, the second codebook coefficients may include six third coefficients. Each third coefficient corresponds to a layer of one first TRP and is used for indicating positions and a quantity of non-zero coefficients at the layer of the first TRP.

For example, the terminal indicates positions and a quantity $K^{NZ}$ of non-zero coefficients in $\tilde{W}_2$ by feeding back $i_{1,7,l}$, where l represents a layer l. For a coefficient indicated as 0 by $i_{1,7,l}$, an amplitude and a phase of the coefficient are not fed back. $i_{1,7,l}$ may be a bit sequence with a length of $2LT^*M_v$ (corresponding to the foregoing first possible implementation and second possible implementation) or $2L^*M_v$ (corresponding to the foregoing third possible implementation), and T is a quantity of the plurality of TRPs. In a case that the terminal indicates not to recommend the TRP by feeding back $i_{1,1,t}$, $i_{1,2,t}$ of all 0s, the terminal does not feed back a coefficient corresponding to $\tilde{W}_2$. In other words, a length of a bit sequence of $i_{1,7,l}$ is $2L\check{T}^*M_v$, $\check{T}$ represents a quantity of $i_{1,1,t}$, $i_{1,2,t}$ that are not all 0s, that is, the quantity of the first TRPs. The terminal may indicate the position of the non-zero coefficient with a bit value corresponding to $i_{1,7,l}$. For example, a bit value of 0 corresponds to a position of a coefficient of 0, and a bit value of 1 corresponds to a position of a non-zero coefficient.

Alternatively, the terminal indicates positions and a quantity $K\_t^{NZ}$ of non-zero coefficients corresponding to a $t^{th}$ TRP in $K\_t^{NZ}$ by feeding back $i_{1,7,l,t}$, where l represents a layer l. For a coefficient indicated as 0 by $i_{1,7,l,t}$, an amplitude and a phase of the coefficient are not fed back. $i_{1,7,l,t}$ is a bit sequence with a length of $2L^*M_v$. In a case that the terminal indicates not to recommend the TRP by feeding back $i_{1,1,t}$, $i_{1,2,t}$ of all 0s, the terminal does not feed back a coefficient corresponding to $\tilde{W}_2$.

(2) A plurality of fourth coefficients, where each of the plurality of fourth coefficients is used for indicating a corresponding position of a strongest beam in the plurality of first TRPs at a corresponding layer in the projection coefficient. In other words, each fourth coefficient corresponds to a layer and is used for indicating the corresponding position of the strongest beam in the plurality of first TRPs at the layer in the projection coefficient.

For example, the terminal may feed back $i_{1,8,l}$ to indicate that the strongest beam is an $i^*_l{}^{th}$ beam, and an amplitude and a phase of a strongest coefficient corresponding to a strongest tap of the strongest beam are not fed back, where the amplitude is 1 by default, and the phase is 0 by default. A bit length of $i_{1,8,l}$ may be $\lceil \log_2 K_0^{NZ} \rceil$, $\lceil \log_2 2L^*\check{T} \rceil$, $\lceil \log_2 2L^*T \rceil$, or $\lceil \log_2 2L \rceil$ (corresponding to the foregoing third possible implementation), and the network obtains the position of the strongest beam based on a codepoint indicated by $i_{1,8,l}$, where $K_0^{NZ}$ represents a quantity of non-zero coefficients of a $0^{th}$ tap.

(3) A plurality of fifth coefficients, where each of the plurality of fifth coefficients is used for indicating an amplitude ratio of a strongest coefficient among the plurality of first TRPs at a corresponding layer. In other words, each fifth coefficient corresponds to a layer and is used for indicating the amplitude ratio of the strongest coefficient among the plurality of first TRPs at the layer.

For example, the terminal feeds back the amplitude ratio of the strongest coefficient among the TRPs by feeding back $i_{2,6,l}$, and only a coefficient corresponding to a corresponding quantized value is fed back after the amplitude ratio is quantized in a quantization table. A bit length of $i_{2,6,l}$ is $N(\check{T}-1)$ or $N(T-1)$, where N is determined based on a length Q of the quantization table, that is, $N=\lceil \log_2 Q \rceil$.

In a case that $W_1$ is used by using the foregoing third possible implementation, the terminal may not feed back the plurality of fifth coefficients, that is, the second codebook coefficients may not include the plurality of fifth coefficients.

(4) A plurality of sixth coefficients, where each of the plurality of sixth coefficients is used for indicating an amplitude ratio of a strongest coefficient among feedback polarizations of the plurality of first TRPs at a corresponding layer. In other words, each sixth coefficient corresponds to a layer and is used for indicating the amplitude ratio of the strongest coefficient among the feedback polarizations of the plurality of first TRPs at the layer. Alternatively, each of the plurality of sixth coefficients is used for indicating an amplitude ratio of a strongest coefficient among feedback polarizations of a layer of the corresponding first TRP. In other words, each sixth coefficient corresponds to a layer of one first TRP and is used for indicating the amplitude ratio of the strongest coefficient among the feedback polarizations of the layer of the first TRP.

For example, the terminal may feed back an amplitude ratio of a strongest coefficient among polarizations of an $l^{th}$ layer of a $t^{th}$ first TRP by feeding back $i_{2,3,l,t}$. A length of $i_{2,3,l,t}$ is N1, where N1 is determined based on a length Q of the quantization table, that is, $N1=\lceil \log_2 Q \rceil$.

Alternatively, in a case that $W_1$ is used by using the foregoing third possible implementation, the terminal may feed back the amplitude ratio of the strongest coefficient among the polarizations of the plurality of first TRPs at a layer l by feeding back $i_{2,3,l}$. A length is N2, where N2 is determined based on a length Q of the quantization table, that is, $N2=\lceil \log_2 Q \rceil$. Quantization tables of N1 and N2 may or may not be consistent. This is not limited in this embodiment of this application.

(5) A plurality of seventh coefficients, where each of the plurality of seventh coefficients is used for indicating an amplitude of a strongest coefficient in a corresponding polarization of the plurality of first TRPs at a corresponding layer in the projection coefficient. In other words, each seventh coefficient corresponds to a layer and is used for indicating the amplitude of the strongest coefficient in the corresponding polarization of the plurality of first TRPs at the layer in the projection coefficient. Alternatively, each of the plurality of seventh coefficients is used for indicating an amplitude of a coefficient of the corresponding first TRP at one layer. In other words, each seventh coefficient corresponds to a layer of one first TRP and is used for indicating the amplitude of the coefficient of the first TRP at the layer.

For example, the terminal may feed back an amplitude of a coefficient corresponding to a $t^{th}$ first TRP at a layer l by feeding back $i_{2,4,l,t}$. A bit length of $i_{2,4,l,t}$ is $M(K\_t^{NZ}-1)$, where M is determined based on a length Q1 of the quantization table, that is, $N=\lceil \log_2 Q1 \rceil$, and $K\_t^{NZ}$ represents a quantity of non-zero coefficients corresponding to the $t^{th}$ TRP.

Alternatively, in a case that $W_1$ is used by using the foregoing third possible implementation, the terminal may feed back an amplitude of a coefficient corresponding to $\tilde{W}_2$ at a layer l by feeding back $i_{2,4,l}$. A bit length is $M(K^{NZ}-1)$, where M is determined based on a length Q1 of the quantization table, that is, $N=\lceil \log_2 Q1 \rceil$, and $K^{NZ}$ represents a quantity of non-zero coefficients indicated by $i_{1,7,l}$.

(6) A plurality of eighth coefficients, where each of the plurality of eighth coefficients is used for indicating a phase of a projection coefficient corresponding to the plurality of first TRPs at a corresponding layer. In other words, each eighth coefficient corresponds to a layer and is used for indicating the phase of the projection coefficient corresponding to the plurality of first TRPs at the layer. Alternatively, each of the plurality of eighth coefficients is used for indicating a phase of a corresponding projection coefficient at one layer of the corresponding first TRP. In other words, each eighth coefficient corresponds to a layer of one first TRP and is used for indicating the phase of the projection coefficient corresponding to the first TRP at the layer.

For example, the terminal may feed back a phase of a coefficient corresponding to a $t^{th}$ first TRP at a layer l by feeding back $i_{2,5,l,t}$. A bit length of $i_{2,5,l,t}$ may be $P(K\_t^{NZ}-1)$, where P is determined based on a phase quantization coefficient or a default value, and $K\_t^{NZ}$ represents a quantity of non-zero coefficients corresponding to the $t^{th}$ TRP.

Alternatively, in a case that $W_1$ is used by using the foregoing third possible implementation, the terminal feeds back a corresponding phase of a coefficient of $\tilde{W}_2$ at a layer l by feeding back $i_{2,5,l}$. A bit length may be $M(K^{NZ}-1)$, where $K^{NZ}$ represents a quantity of non-zero coefficients indicated by $i_{1,7,l}$.

In a possible implementation, the third codebook coefficient may include at least one of the following coefficients:

(1) A ninth coefficient, used for indicating a start position of $\check{T}$ fed-back windows in all tap positions, where $\check{T}$ is a quantity of TRPs included in the plurality of first TRPs.

That is, $\check{T}$ windows fed back by the terminal are located at the start position of all tap positions. For example, the terminal obtains, based on a network configuration, a quantity N3 of PMI measurement subbands, then the quantity of taps is equal to the quantity of subbands, and the number ranges from 0 to N3−1. In this case, the start position of the window is one of 0 to N3−1.

For example, the terminal feeds back $\check{T}$ or the start position of T windows by feeding back $i_{1,5,t}$.

(2) A tenth coefficient, used for indicating $M_v/\check{T}$ tap positions corresponding to each first TRP, where $M_v$ is the first predetermined quantity.

For example, the terminal may feed back $M_v/\check{T}$ or $M_v/\check{T}$ tap positions corresponding to a $t^{th}$ TRP by feeding back $i_{1,6,l,t}$.

The terminal can reduce feedback overheads by selecting the feedback window, that is, by narrowing down a range of the selected taps. For example, if there are 50 tap coefficients in total and a length of the window is 20, the finally selected tap is located in the 20 taps in the window. Therefore, the network-side device only needs to learn the start position of the windows and the position of the tap in the window, to obtain the position of the tap in all taps.

According to the foregoing method in this embodiment of this application, the terminal can feed back the precoding matrix for multi-TRP transmission more accurately, to improve performance of multi-TRP transmission. In addition, in embodiments of this application, some TRPs may be selected for feedback based on a feedback amount, to reduce feedback overheads.

Figures 3, 4:
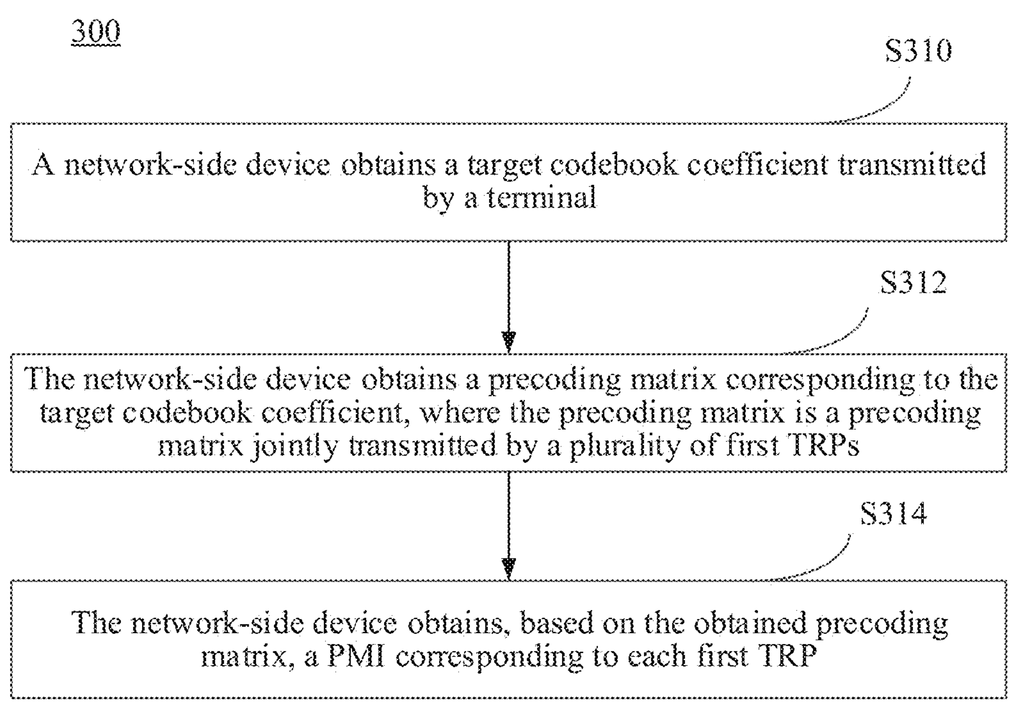
FIG. 3 is a schematic flowchart of a method for obtaining a precoding matrix indicator according to an embodiment of this application.
FIG. 4 is a diagram of a structure of a precoding matrix feedback apparatus according to an embodiment of this application.

FIG. 3 is a schematic flowchart of a method for obtaining a precoding matrix indicator according to an embodiment of this application. The method 300 may be performed by a network-side device. In other words, the method may be performed by software or hardware installed on the network-side device. As shown in FIG. 3, the method mainly includes the following steps.

S310: The network-side device obtains a target codebook coefficient transmitted by a terminal.

The terminal may transmit the target codebook coefficient by using the foregoing method 200. For details, refer to the foregoing descriptions of the method 200.

S312: The network-side device obtains a precoding matrix corresponding to the target codebook coefficient, where the precoding matrix is a precoding matrix jointly transmitted by a plurality of first TRPs.

In this embodiment of this application, the network-side device may obtain, based on the target codebook coefficient, the precoding matrix jointly transmitted by the plurality of first TRPs.

S314: The network-side device obtains, based on the obtained precoding matrix, a PMI corresponding to each first TRP.

After obtaining the precoding matrix jointly transmitted by the plurality of first TRPs, the network-side device may obtain the PMI corresponding to each first TRPs from the precoding matrix.

According to the foregoing method in this embodiment of this application, the network-side device can obtain the precoding matrix for multi-TRP transmission more accurately, to improve performance of multi-TRP transmission.

In a possible implementation, the target codebook coefficient may include:

(1) a first codebook coefficient, where the first codebook coefficient is used for obtaining or indicating complex vectors corresponding to the plurality of first TRPs;

(2) a second codebook coefficient, where the second codebook coefficient is used for obtaining or indicating a projection coefficient of the precoding matrix; and (3) a third codebook coefficient, where the third codebook coefficient is used for obtaining or indicating a first predetermined quantity of complex vectors of the precoding matrix.

Optionally, the first codebook coefficient includes: $\check{T}$ first coefficients and $\check{T}$ second coefficients, where $\check{T}$ is a quantity of TRPs included in the plurality of first TRPs, an i-th first coefficient indicates a number of an orthogonal beam group corresponding to an i-th first TRP, and an i-th second coefficient indicates numbers of a predetermined quantity of beams in the orthogonal beam group corresponding to the i-th first TRP, where i=1, 2, . . . , $\check{T}$.

For example, if $$W = W_1 \tilde{W}_2 W_f^H,$$

for the first codebook $W_1$, the first codebook coefficient may include a coefficient $i_{1,1,t}$ and a coefficient $i_{1,2,t}$, where t=0, 1, . . . , $\check{T}-1$ indicates beam complex vectors corresponding to $\check{T}$ first TRPs selected by the terminal, and the network-side device obtains the beam complex vectors by using the fed-back coefficients, to obtain the first codebook. For a specific value of t, $i_{1,1,t}$ is used for indicating a number of an orthogonal DFT beam group, and $i_{1,2,t}$ is used for indicating numbers of a specific quantity of beams selected in the orthogonal beam group.

In a possible implementation, the first codebook coefficient further includes: first indication information, where the first indication information indicates that the terminal does not recommend to use at least one second TRP for coordinated transmission, and the second TRP is a TRP other than the plurality of first TRPs in the plurality of TRPs.

In a possible implementation, the first indication information may include: N first coefficients and N second coefficients, where N is a quantity of TRPs included in the at least one second TRP, a value of a first coefficient corresponding to a j-th second TRP is a first predetermined value, and a value of a second coefficient corresponding to the j-th second TRP is a second predetermined value, where j=1, 2, . . . , N. The first predetermined value and the second predetermined value may be any value agreed in advance on the network side, for example, 0.

Alternatively, in another possible implementation, the first indication information may include: identification information of the at least one second TRP. In other words, the terminal indicates, by feeding back the identification information of the second TRP, that the terminal does not recommend the network side to use the TRPs for coordinated transmission to the terminal.

Alternatively, in still another possible implementation, the network-side device may alternatively consider that in a case that the terminal does not feed back a first coefficient and a second coefficient corresponding to the at least one second TRP, the terminal does not recommend to use the at least one second TRP for coordinated transmission to the terminal. In other words, in the possible implementation, the first codebook coefficient is further used for indicating that the terminal recommends to use the plurality of first TRPs for coordinated transmission.

In other words, in one or more possible implementations, the terminal may indicate, by not feeding back a coefficient $i_{1,1,t}$ and a coefficient $i_{1,2,t}$ corresponding to one or some t values or by feeding back specific values (for example, $i_{1,1,t}$ and/or $i_{1,2,t}$ is 0) to a coefficient $i_{1,1,t}$ and a coefficient $i_{1,2,t}$ corresponding to one or some t values, a TRP that is not recommended by the terminal (that is, a TRP corresponding to a port group or resource corresponding to one or some t values is not recommended) to the network. In this case, t=0, 1, . . . , T−1, and T is a quantity of port groups or a quantity of resources associated with one piece of JT CSI configured by the network.

For example, in a case that T=4, the terminal feeds back $i_{1,1,0}$, $i_{1,1,1}$, $i_{1,1,2}$, $i_{1,1,3}$ and $i_{1,2,0}$, $i_{1,2,1}$, $i_{1,2,2}$, $i_{1,2,3}$ to indicate the network to obtain $W_1$. If a network higher layer signaling indicates that the terminal may perform TRP selection, the terminal may set $i_{1,1,2}$, $i_{1,1,3}$ and $i_{1,2,2}$, $i_{1,2,3}$ corresponding to a corresponding port group or resource with poor quality to 0 for feedback, and the network-side device receives $i_{1,1,t}$, $i_{1,2,t}$ of all 0s. In this case, it indicates that the terminal does not recommend the associated TRP for transmission or that the terminal considers that the channel quality of the associated TRP is poor.

Therefore, in a possible implementation, after the network-side device obtains the precoding matrix indicator PMI corresponding to each first TRP, the method further includes: The network-side device determines that the plurality of first TRPs are used to perform coordinated transmission to the terminal.

In a possible implementation, the second codebook coefficient may include at least one of the following:

(1) A plurality of third coefficients, where each of the plurality of third coefficients is used for indicating positions and a quantity of non-zero coefficients of the plurality of first TRPs at a corresponding layer. In other words, each third coefficient corresponds to a layer and is used for indicating the positions and the quantity of non-zero coefficients of the plurality of first TRPs at the layer. Alternatively, each of the plurality of third coefficients is used for indicating positions and a quantity of non-zero coefficients at one layer of the corresponding first TRP. In other words, each third coefficient corresponds to a layer of one first TRP and is used for indicating the positions and the quantity of non-zero coefficients of the first TRP at the layer.

For example, the plurality of third coefficients may include M $i_{1,7,l}$ (where M is a total quantity of layers), where each $i_{1,7,l}$ indicates positions and a quantity $K^{NZ}$ of non-zero coefficients of $\tilde{W}_2$ at one layer, and l represents a layer l. $i_{1,7,l}$ may be a bit sequence with a length of $2LT*M_v$ (corresponding to the foregoing first possible implementation and second possible implementation) or $2L*M_v$ (corresponding to the foregoing third possible implementation), and T is a quantity of the plurality of TRPs. In a case that the terminal indicates not to recommend the TRP by feeding back $i_{1,1,t}$, $i_{1,2,t}$ of all 0s, the terminal does not feed back a coefficient corresponding to $\tilde{W}_2$. In other words, a length of a bit sequence of $i_{1,7,l}$ is $2L\check{T}*M_v$, $\check{T}$ represents a quantity of $i_{1,1,t}$, $i_{1,2,t}$ that are not all 0s, that is, the quantity of the first TRPs. The terminal may indicate the position of the non-zero coefficient with a bit value corresponding to $i_{1,7,l}$. For example, a bit value of 0 corresponds to a position of a coefficient of 0, and a bit value of 1 corresponds to a position of a non-zero coefficient.

Alternatively, the plurality of third coefficients may include $M*\check{T}$ $i_{1,7,l,t}$ (where M is a total quantity of layers), where each $i_{1,7,l,t}$ indicates positions and a quantity $K\_t^{NZ}$ of non-zero coefficients of a $t^{th}$ TRP in $\tilde{W}_2$ at one layer, and l represents a layer l. $i_{1,7,l,t}$ is a bit sequence with a length of $2L*M_v$. In a case that the terminal indicates not to recommend the TRP by feeding back $i_{1,1,t}$, $i_{1,2,t}$ of all 0s, the terminal does not feed back a coefficient corresponding to $\tilde{W}_2$.

(2) A plurality of fourth coefficients, where each of the plurality of fourth coefficients is used for indicating a corresponding position of a strongest beam in the plurality of first TRPs at a corresponding layer in the projection coefficient. In other words, each fourth coefficient corresponds to a layer and is used for indicating the corresponding position of the strongest beam in the plurality of first TRPs at the layer in the projection coefficient.

For example, the plurality of fourth coefficients may include a plurality of $i_{1,8,l}$, $i_{1,8,l}$, to indicate that the strongest beam is an $i^*_l{}^{th}$ beam, and an amplitude and a phase of a strongest coefficient corresponding to a strongest tap of the strongest beam are not fed back, where the amplitude is 1 by default, and the phase is 0 by default. A bit length of $i_{1,8,l}$ may be $\lceil \log_2 K_0^{NZ} \rceil$, $\lceil \log_2 2L*\check{T} \rceil$, $\lceil \log_2 2L*T \rceil$, or $\lceil \log_2 2L \rceil$ (corresponding to the foregoing third possible implementation), and the network-side device obtains the position of the strongest beam based on a codepoint indicated by $i_{1,8,l}$, where $K_0^{NZ}$ represents a quantity of non-zero coefficients of a $0^{th}$ tap.

(3) A plurality of fifth coefficients, where each of the plurality of fifth coefficients is used for indicating an amplitude ratio of a strongest coefficient among the plurality of first TRPs at a corresponding layer. In other words, each fifth coefficient corresponds to a layer and is used for indicating the amplitude ratio of the strongest coefficient among the plurality of first TRPs at the layer.

For example, the plurality of fifth coefficients may include a plurality of $i_{2,6,l}$, used for feeding back the amplitude ratio of the strongest coefficient among the TRPs, and only a coefficient corresponding to a corresponding quantized value is fed back after the amplitude ratio is quantized in a quantization table. A bit length of $i_{2,6,l}$ is $N(\check{T}-1)$ or $N(T-1)$, where N is determined based on a length Q of the quantization table, that is, $N=\lceil \log_2 Q \rceil$.

If the second codebook coefficient does not include the plurality of fifth coefficients, $W_1$ is indicated to be used by using foregoing third possible implementation.

(4) A plurality of sixth coefficients, where each of the plurality of sixth coefficients is used for indicating an amplitude ratio of a strongest coefficient among feedback polarizations of the plurality of first TRPs at a corresponding layer. In other words, each sixth coefficient corresponds to a layer and is used for indicating the amplitude ratio of the strongest coefficient among the feedback polarizations of the plurality of first TRPs at the layer. Alternatively, each of the plurality of sixth coefficients is used for indicating an amplitude ratio of a strongest coefficient among feedback polarizations of a layer of the corresponding first TRP. In other words, each sixth coefficient corresponds to a layer of one first TRP and is used for indicating the amplitude ratio of the strongest coefficient among the feedback polarizations of the layer of the first TRP.

For example, the plurality of sixth coefficients may include a plurality of $i_{2,3,l,t}$, to feed back an amplitude ratio of a strongest coefficient among polarizations of a $t^{th}$ first TRP at a layer l. A length of $i_{2,3,l,t}$ is N1, where N1 is determined based on a length Q of the quantization table, that is, $N1=\lceil \log_2 Q \rceil$.

Alternatively, in a case that $W_1$ is used by using the foregoing third possible implementation, the plurality of sixth coefficients may include a plurality of $i_{2,3,l}$, to feed back the amplitude ratio of the strongest coefficient among the polarizations of the plurality of first TRPs at a layer l. A length is N2, where N2 is determined based on a length Q of the quantization table, that is, $N2=\lceil \log_2 Q \rceil$. Quantization tables of N1 and N2 may or may not be consistent. This is not limited in this embodiment of this application.

(5) A plurality of seventh coefficients, where each of the plurality of seventh coefficients is used for indicating an amplitude of a strongest coefficient in a corresponding polarization of the plurality of first TRPs at a corresponding layer in the projection coefficient. In other words, each seventh coefficient corresponds to a layer and is used for indicating the amplitude of the strongest coefficient in the corresponding polarization of the plurality of first TRPs at the layer in the projection coefficient. Alternatively, each of the plurality of seventh coefficients is used for indicating an amplitude of a coefficient of the corresponding first TRP at one layer. In other words, each seventh coefficient corresponds to a layer of one first TRP and is used for indicating the amplitude of the coefficient of the first TRP at the layer.

For example, the plurality of seventh coefficients may include a plurality of $i_{2,4,l,t}$, respectively used for feeding back an amplitude of a coefficient corresponding to a $t^{th}$ first TRP at a layer l. A bit length of $i_{2,4,l,t}$ is $M(K\_t^{NZ}-1)$, where M is determined based on a length Q1 of the quantization table, that is, $N=\lceil \log_2 Q1 \rceil$, and $K\_t^{NZ}$ represents a quantity of non-zero coefficients corresponding to the $t^{th}$ TRP.

Alternatively, in a case that $W_1$ is used by using the foregoing third possible implementation, the plurality of seventh coefficients may include a plurality of $i_{2,4,l}$, respectively used for feeding back an amplitude of a coefficient corresponding to $\tilde{W}_2$ at a layer l. A bit length is $M(K^{NZ}-1)$, where M is determined based on a length Q1 of the quantization table, that is, $N=\lceil \log_2 Q1 \rceil$, and $K^{NZ}$ represents a quantity of non-zero coefficients indicated by $i_{1,7,l}$.

(6) A plurality of eighth coefficients, where each of the plurality of eighth coefficients is used for indicating a phase of a projection coefficient corresponding to the plurality of first TRPs at a corresponding layer. In other words, each eighth coefficient corresponds to a layer and is used for indicating the phase of the projection coefficient corresponding to the plurality of first TRPs at the layer. Alternatively, each of the plurality of eighth coefficients is used for indicating a phase of a corresponding projection coefficient at one layer of the corresponding first TRP. In other words, each eighth coefficient corresponds to a layer of one first TRP and is used for indicating the phase of the projection coefficient corresponding to the first TRP at the layer.

For example, the plurality of eighth coefficients may include a plurality of $i_{2,5,l,t}$, respectively used for indicating a phase of a coefficient corresponding to a $t^{th}$ first TRP. A bit length of $i_{2,5,l,t}$ may be $P(K\_t^{NZ}-1)$, where P is determined based on a phase quantization coefficient or a default value, and $K\_t^{NZ}$ represents a quantity of non-zero coefficients corresponding to the $t^{th}$ TRP.

Alternatively, in a case that $W_1$ is used by using the foregoing third possible implementation, the plurality of eighth coefficients may include a plurality of $i_{2,5,l}$, respectively used for indicating a phase of a coefficient corresponding to $\tilde{W}_2$. A bit length may be $M(K^{NZ}-1)$, where $K^{NZ}$ represents a quantity of non-zero coefficients indicated by $i_{1,7,l}$.

In a possible implementation, the third codebook coefficient may include at least one of the following:

(1) A ninth coefficient, used for indicating a start position of $\check{T}$ fed-back windows in all tap positions, where $\check{T}$ is a quantity of TRPs included in the plurality of first TRPs.

That is, $\check{T}$ windows are located at the start position of all tap positions. For example, the terminal obtains, based on a network configuration, a quantity N3 of PMI measurement subbands, then the quantity of taps is equal to the quantity of subbands, and the number ranges from 0 to N3−1. In this case, the start position of the window is one of 0 to N3−1.

For example, the ninth coefficient may include $i_{1,5,t}$, used for indicating $\check{T}$ or a start position of T windows.

(2) A tenth coefficient, used for indicating $M_v/\check{T}$ tap positions corresponding to each first TRP, where $M_v$ is the first predetermined quantity.

For example, the tenth coefficient may include a plurality of $i_{1,6,l,t}$, respectively used for indicating $M_v/T$ or $M_v/\check{T}$ tap positions corresponding to a $t^{th}$ first TRP.

The technical solutions provided by embodiments of this application are described below by using an embodiment.

For example, the terminal calculates a precoding matrix jointly transmitted by two TRPs by using reference signal resources configured by the network, and performs feedback by using a Type2 codebook. The network-side device obtains, based on feedback amounts $i_{1,1,1}$ and $i_{1,2,1}$, L beam vectors corresponding to a first TRP, and obtains, based on feedback amounts $i_{1,1,2}$ and $i_{1,2,2}$, L beam vectors corresponding to a second TRP. In this case, the network-side device obtains a $W_1$ matrix as follows:

$$W_1 = \begin{bmatrix} V_0 & 0 \\ 0 & V_1 \end{bmatrix}, \text{ where } V_t = \begin{bmatrix} v_0 v_1 \ldots v_{L-1} & 0 \\ 0 & v_0 v_1 \ldots v_{L-1} \end{bmatrix};$$

$$v_i,\ i \in \{0, 1, \ldots, L-1\}$$

represents DFT beam vectors in a dimension of $N_1N_2\times 1$, and $N_1N_2$ represents a quantity of ports of a specific polarization of the TRP.

The network-side device obtains, based on the feedback amount $i_{1,7,l}$, positions and a quantity of non-zero coefficients in $\tilde{W}_2$; obtains a strongest coefficient based on a position of a strongest beam that is fed back by $i_{1,8,l}$; and sets an amplitude of the strongest coefficient to 1 and a phase of the strongest coefficient to 0. Then the network-side device obtains, based on the fed-back $i_{2,6,l}$, quantized amplitude values among TRPs, and $$p_i^{(0)},\ i = 0, 1, \ldots, 4L-1,$$

where $$p_i^{(0)}$$

corresponding to i=0, 1, . . . , 2L−1 are the same, and $$p_i^{(0)}$$

corresponding to i=2L, 2L+1, . . . , 4L−1 are the same.

Then, the network-side device obtains, based on the fed-back $i_{2,3,l,1}$, $i_{2,3,l,2}$, a quantized amplitude value among each TRP polarization, and $$p_i^{(1)},\ i = 0, 1, \ldots, 2LT-1,$$

where $$p_i^{(1)}$$

corresponding to i=0, 1, . . . , L−1 are the same, $$p_i^{(1)}$$

corresponding to i=0, 1, . . . , L−1 are the same, $$p_i^{(1)}$$

corresponding to i=L, L+1, . . . , 2L−1 are the same, $$p_i^{(1)}$$

corresponding to i=2L, 2L+1, . . . , 3L−1 are the same, and $$p_i^{(1)}$$

corresponding to i=3L, 1, . . . , 4L−1 are the same.

Then, the network-side device separately obtains, based on the fed-back $i_{2,4,l,1}$, $i_{2,4,l,2}$ and $i_{2,5,l,1}$, $i_{2,5,l,2}$, an amplitude coefficient $$p_{i,m}^{(2)}$$

and a phase coefficient $\varphi_{i,m}$ corresponding to a beam i with a tap m. In this case, $\tilde{W}_2$ is obtained according to the following formula:

$$\tilde{W}_2 = \begin{bmatrix} p_0^{(0)}p_0^{(1)} & \dots & 0 \\ \vdots & \ddots & \vdots \\ 0 & \dots & p_{2LT-1}^{(0)}p_{2LT-1}^{(1)} \end{bmatrix} \begin{bmatrix} p_{0,0}^{(2)}\varphi_{0,0} & \dots & p_{0,Mv-1}^{(2)}\varphi_{0,Mv-1} \\ \vdots & \ddots & \vdots \\ p_{2LT-1,0}^{(0)}\varphi_{2LT-1,0} & \dots & p_{2LT-1,Mv-1}^{(0)}\varphi_{2LT-1,Mv-1} \end{bmatrix}$$

The network-side device obtains $M_v$ DFT vectors based on one or all of the fed-back $i_{1,5,1}$, $i_{1,5,2}$ and $i_{1,6,l,1}$, $i_{1,6,l,2}$, to form $W_f=[f_0 f_1 \dots f_{Mv-1}]$, where $f_i$, $i\in\{0, 1, \dots, Mv-1\}$ represents a DFT vector in a dimension of $1\times N_3$, and $N_3$ is a quantity of PMI measurement subbands.

After $$W_1\tilde{W}_2W_f^H$$

is obtained, a precoding matrix W at a layer l is represented as:

$$W = W_1\tilde{W}_2W_f^H$$

For example, the terminal selects the best two TRPs from the three TRPs by using reference signal resources configured by the network; calculates a precoding matrix jointly transmitted by the two TRPs; and performs feedback by using a Type2 codebook. The network-side device obtains, based on feedback amounts $i_{1,1,1}$ and $i_{1,2,1}$, L beam vectors corresponding to a first TRP; obtains, based on feedback amounts $i_{1,1,2}$ and $i_{1,2,2}$, L beam vectors corresponding to a second TRP; and obtains, based on feedback amounts $i_{1,1,3}$ and $i_{1,2,3}$, L beam vectors corresponding to a third TRP. When the network discovers that the feedback amounts $i_{1,1,3}$ and $i_{1,2,3}$ are both 0, the network obtains the TRPs selected by the terminal, namely, a TRP 1 corresponding to $i_{1,1,1}$ and $i_{1,2,1}$ and a TRP 2 corresponding to $i_{1,1,2}$ and $i_{1,2,2}$.

Therefore, the network-side device obtains a matrix $W_1$ as follows:

$$W_1 = \begin{bmatrix} V_0 & 0 \\ 0 & V_1 \end{bmatrix}, \text{ where } V_t = \begin{bmatrix} v_0 v_1 \dots v_{L-1} & 0 \\ 0 & v_0 v_1 \dots v_{L-1} \end{bmatrix}; \quad v_i, i \in \{0, 1, \dots, L-1\}$$

represents DFT beam vectors in a dimension of $N_1N_2\times 1$, and $N_1N_2$ represents a quantity of ports of a specific polarization of the TRP.

The network-side device obtains, based on the feedback amount $i_{1,7,l}$, positions and a quantity of non-zero coefficients in $\tilde{W}_2$. In this case, because the feedback amounts $i_{1,1,3}$ and $i_{1,2,3}$ are both 0, a bit sequence length of $i_{1,7,l}$ is $4L*M_v$. The network-side device obtains a strongest coefficient based on a position of a strongest beam that is fed back by $i_{1,8,l}$. In this case, a bit length of $i_{1,8,l}$ is $\lceil \log_2 K_0^{NZ} \rceil$ (when rank=1) or $\lceil \log_2 4L \rceil$ (when rank>1), where a TRP that is not selected is not counted. An amplitude and a phase of the strongest coefficient are set to 1 and 0. Then the network-side device obtains, based on the fed-back $i_{2,6,l}$, quantized amplitude values among TRPs, and $$p_i^{(0)}, i = 0, 1, \dots, 4L-1,$$

where $$p_i^{(0)}$$

corresponding to i=0, 1, . . . , 2L−1 are the same, and $$p_i^{(0)}$$

corresponding to i=2L, 2L+1, . . . , 4L−1 are the same. For $$p_i^{(0)}, i = 4L, 4L+1, \dots, 6L-1,$$

because the TRP is not selected, the quantized amplitude value is set to 0.

Then, the network-side device obtains, based on the fed-back $i_{2,3,l,1}$, $i_{2,3,l,2}$, a quantized amplitude value among each TRP polarization, and $$p_i^{(1)}, i = 0, 1, \dots, 2LT-1,$$

where $$p_i^{(1)}$$

corresponding to i=0, 1, . . . , L−1 are the same, $$p_i^{(1)}$$

corresponding to i=0, 1, . . . , L−1 are the same, $$p_i^{(1)}$$

corresponding to i=L, L+1, . . . , 2L−1 are the same, $$p_i^{(1)}$$

corresponding to i=2L, 2L+1, . . . , 3L−1 are the same, and $$p_i^{(1)}$$

corresponding to i=3L, 1, . . . , 4L−1 are the same. For a TRP that is not selected, the quantized amplitude value is set to 0.

Then, the network-side device separately obtains, based on the fed-back $i_{2,4,l,1}$, $i_{2,4,l,2}$ and $i_{2,5,l,1}$, $i_{2,5,l,2}$, an amplitude coefficient $$p_{i,m}^{(2)}$$

and a phase coefficient $\varphi_{i,m}$ corresponding to a beam i with a tap m. For a TRP that is not selected, the amplitude coefficient and the phase coefficient are set to 0. In this case, $\tilde{W}_2$ is obtained according to the following formula:

$$\tilde{W}_2 = \begin{bmatrix} p_0^{(0)} p_0^{(1)} & \cdots & 0 \\ \vdots & \ddots & \vdots \\ 0 & \cdots & p_{2LT-1}^{(0)} p_{2LT-1}^{(1)} \end{bmatrix} \begin{bmatrix} p_{0,0}^{(2)} \varphi_{0,0} & \cdots & p_{0,Mv-1}^{(2)} \varphi_{0,Mv-1} \\ \vdots & \ddots & \vdots \\ p_{2LT-1,0}^{(0)} \varphi_{2LT-1,0} & \cdots & p_{2LT-1,Mv-1}^{(0)} \varphi_{2LT-1,Mv-1} \end{bmatrix}$$

The network-side device obtains $M_v$ DFT vectors based on one or all of the fed-back $i_{1,5,1}$, $i_{1,5,2}$ and $i_{1,6,l,1}$, $i_{1,6,l,2}$, to form $W_f=[f_0 f_1 \ldots f_{Mv-1}]$, where $f_i$, $i \in \{0, 1, \ldots, Mv-1\}$ represents a DFT vector in a dimension of $1 \times N_3$, and $N_3$ is a quantity of PMI measurement subbands.

After $$W_1 \tilde{W}_2 W_f^H$$

is obtained, a precoding matrix W at a layer l is represented as:

$$W = W_1 \tilde{W}_2 W_f^H$$

For example, the terminal selects the best two TRPs from the three TRPs by using reference signal resources configured by the network; calculates a precoding matrix jointly transmitted by the two TRPs; and performs feedback by using a Type2 codebook. The network-side device obtains, based on feedback amounts $i_{1,1,1}$ and $i_{1,2,1}$, L beam vectors corresponding to a first TRP; obtains, based on feedback amounts $i_{1,1,2}$ and $i_{1,2,2}$, L beam vectors corresponding to a second TRP; and obtains, based on feedback amounts $i_{1,1,3}$ and $i_{1,2,3}$, L beam vectors corresponding to a third TRP. When the network discovers that the feedback amounts $i_{1,1,3}$ and $i_{1,2,3}$ are both 0, the network-side device obtains the TRPs selected by the terminal, namely, a TRP 1 corresponding to $i_{1,1,1}$ and $i_{1,2,1}$ and a TRP 2 corresponding to $i_{1,1,2}$ and $i_{1,2,2}$.

Therefore, the network-side device obtains a matrix $W_1$ as follows:

$$W_1 = \begin{bmatrix} B_0 & 0 \\ 0 & B_1 \end{bmatrix}, \text{ where } B_p = \begin{bmatrix} v_0^0 v_1^0 \ldots v_{L-1}^0 \\ v_0^1 v_1^1 \ldots v_{L-1}^1 \\ 00 \ldots 0 \end{bmatrix},$$

where $v_i$, $i \in \{0, 1, \ldots, L-1\}$ represents DFT beam vectors in a dimension of $N_1N_2 \times 1$, and $N_1N_2$ represents a quantity of ports of a specific polarization of the TRP.

The network-side device obtains, based on the feedback amount $i_{1,7,l}$, positions and a quantity of non-zero coefficients in $\tilde{W}_2$. In this case, a bit sequence length of $i_{1,7,l}$ is $2L*M_v$. The network-side device obtains a strongest coefficient based on a position of a strongest beam that is fed back by $i_{1,8,l}$. In this case, a bit length of $i_{1,8,l}$ is $\lceil \log_2 K_0^{NZ} \rceil$ (when rank=1) or $\lceil \log_2 2L \rceil$ (when rank>1), where the amplitude of the strongest coefficient is set to 1 and the phase of the strongest coefficient is set to 0.

Then, the network-side device obtains, based on the fed-back $i_{2,3,l}$, a quantized amplitude value $$p_i^{(1)}, i = 0, 1, \ldots, 2L-1$$

among polarizations, where $$p_i^{(1)}$$

corresponding to i=0, 1, . . . , L−1 are the same, and $$p_i^{(1)}$$

corresponding to i=0, 1, . . . , L−1 are the same.

Then, the network-side device separately obtains, based on the fed-back $i_{2,4,l}$ and $i_{2,5,l}$, an amplitude coefficient $$p_{i,m}^{(2)}$$

and a phase coefficient $\varphi_{i,m}$ corresponding to a beam i with a tap m. In this case, $\tilde{W}_2$ is obtained according to the following formula:

$$\tilde{W}_2 = \begin{bmatrix} p_0^{(0)} p_0^{(1)} & \cdots & 0 \\ \vdots & \ddots & \vdots \\ 0 & \cdots & p_{2LT-1}^{(0)} p_{2LT-1}^{(1)} \end{bmatrix} \begin{bmatrix} p_{0,0}^{(2)} \varphi_{0,0} & \cdots & p_{0,Mv-1}^{(2)} \varphi_{0,Mv-1} \\ \vdots & \ddots & \vdots \\ p_{2LT-1,0}^{(0)} \varphi_{2LT-1,0} & \cdots & p_{2LT-1,Mv-1}^{(0)} \varphi_{2LT-1,Mv-1} \end{bmatrix}$$

The network-side device obtains $M_v$ DFT vectors based on one or all of the fed-back $i_{1,5,1}$, $i_{1,5,2}$ and $i_{1,6,l,1}$, $i_{1,6,l,2}$, to form $W_f=[f_0 f_1 \ldots f_{Mv-1}]$, where $f_i$, $i \in \{0, 1, \ldots, Mv-1\}$ represents a DFT vector in a dimension of $1 \times N_3$, and N3 is a quantity of PMI measurement subbands.

After $$W_1 \tilde{W}_2 W_f^H$$

is obtained, a precoding matrix W at a layer l is represented as:

$$W = W_1 \tilde{W}_2 W_f^H$$

The precoding matrix feedback method provided in this embodiment of this application may be performed by a precoding matrix feedback apparatus. In embodiments of this application, an example in which the precoding matrix feedback apparatus performs the precoding matrix feedback method is used to describe the precoding matrix feedback apparatus provided in embodiments of this application.

FIG. 4 is a diagram of a structure of a precoding matrix feedback apparatus according to an embodiment of this application. As shown in FIG. 4, the precoding matrix feedback apparatus 400 mainly includes: a measurement module 401, a first obtaining module 402, a second obtaining module 403, and a feedback module 404.

In this embodiment of this application, the measurement module 401 is configured to measure channel reference signals transmitted by a plurality of TRPs; the first obtaining module 402 is configured to obtain, based on a channel reference signal measurement result, a precoding matrix jointly transmitted by a plurality of first TRPs, where the first TRPs are TRPs in the plurality of TRPs; the second obtaining module 403 is configured to obtain a target codebook coefficient of the precoding matrix, where the target codebook coefficient is used for obtaining or indicating the precoding matrix; and the feedback module 404 is configured to transmit the target codebook coefficient of the precoding matrix to a network-side device.

In a possible implementation, the target codebook coefficient includes:

- a first codebook coefficient, where the first codebook coefficient is used for obtaining or indicating complex vectors corresponding to the plurality of first TRPs;
- a second codebook coefficient, where the second codebook coefficient is used for obtaining or indicating a projection coefficient of the precoding matrix; and
- a third codebook coefficient, where the third codebook coefficient is used for obtaining or indicating a first predetermined quantity of complex vectors of the precoding matrix.

In a possible implementation, the first codebook coefficient includes: T first coefficients and T second coefficients, where T is a quantity of TRPs comprised in the plurality of first TRPs, an i-th first coefficient indicates a number of an orthogonal beam group corresponding to an i-th first TRP, and an i-th second coefficient indicates numbers of a predetermined quantity of beams in the orthogonal beam group corresponding to the i-th first TRP, where i=1, 2, . . . , T.

In a possible implementation, the first codebook coefficient further includes: first indication information, where the first indication information indicates that the terminal does not recommend to use at least one second TRP for coordinated transmission, and the second TRP is a TRP other than the plurality of first TRPs in the plurality of TRPs.

In a possible implementation, the first indication information includes: N first coefficients and N second coefficients, where N is a quantity of TRPs included in the at least one second TRP, a value of a first coefficient corresponding to a j-th second TRP is a first predetermined value, and a value of a second coefficient corresponding to the j-th second TRP is a second predetermined value, where j=1, 2, . . . , N.

In a possible implementation, the first indication information includes: identification information of the at least one second TRP.

In a possible implementation, the first codebook coefficient is further used for indicating that the terminal recommends to use the plurality of first TRPs for coordinated transmission.

In a possible implementation, the second codebook coefficient includes at least one of the following:

- a plurality of third coefficients, where each of the plurality of third coefficients is used for indicating positions and a quantity of non-zero coefficients of the plurality of first TRPs at a corresponding layer, or each of the plurality of third coefficients is used for indicating positions and a quantity of non-zero coefficients at one layer of the corresponding first TRP;
- a plurality of fourth coefficients, where each of the plurality of fourth coefficients is used for indicating a corresponding position of a strongest beam in the plurality of first TRPs at a corresponding layer in the projection coefficient;
- a plurality of fifth coefficients, where each of the plurality of fifth coefficients is used for indicating an amplitude ratio of a strongest coefficient among the plurality of first TRPs at a corresponding layer;
- a plurality of sixth coefficients, where each of the plurality of sixth coefficients is used for indicating an amplitude ratio of a strongest coefficient among feedback polarizations of the plurality of first TRPs at a corresponding layer, or each of the plurality of sixth coefficients is used for indicating an amplitude ratio of a strongest coefficient among feedback polarizations at one layer of the corresponding first TRPs;
- a plurality of seventh coefficients, where each of the plurality of seventh coefficients is used for indicating an amplitude of a strongest coefficient in a corresponding polarization of the plurality of first TRPs at a corresponding layer in the projection coefficient, or each of the plurality of seventh coefficients is used for indicating an amplitude of a coefficient of the corresponding first TRP at one layer; or
- a plurality of eighth coefficients, where each of the plurality of eighth coefficients is used for indicating a phase of a projection coefficient corresponding to the plurality of first TRPs at a corresponding layer, or each of the plurality of eighth coefficients is used for indicating a phase of a corresponding projection coefficient at one layer of the corresponding first TRP.

In a possible implementation, the third codebook coefficient includes at least one of the following:

- a ninth coefficient, used for indicating a start position of T fed-back windows in all tap positions, where T is a quantity of TRPs included in the plurality of first TRPs; or
- a tenth coefficient, used for indicating $M_\nu/\check{T}$ tap positions corresponding to each first TRP, where $M_\nu$ is the first predetermined quantity.

The precoding matrix feedback apparatus in embodiments of this application may be an electronic device, for example, an electronic device with an operating system, or may be a component in the electronic device, for example, an integrated circuit or a chip. The electronic device may be a terminal or another device other than a terminal. For example, the terminal may include, but is not limited to, the type of terminal 11 listed above, and the another device may be a server, a network attached storage (NAS) device, or the like. This is not particularly limited in this embodiment of this application.

The precoding matrix feedback apparatus provided in this embodiment of this application can implement all processes implemented by the terminal in the method embodiments shown in FIG. 2 and FIG. 3 and achieve same technical effects. Details are not described herein again to avoid repetition.

Figure 5:
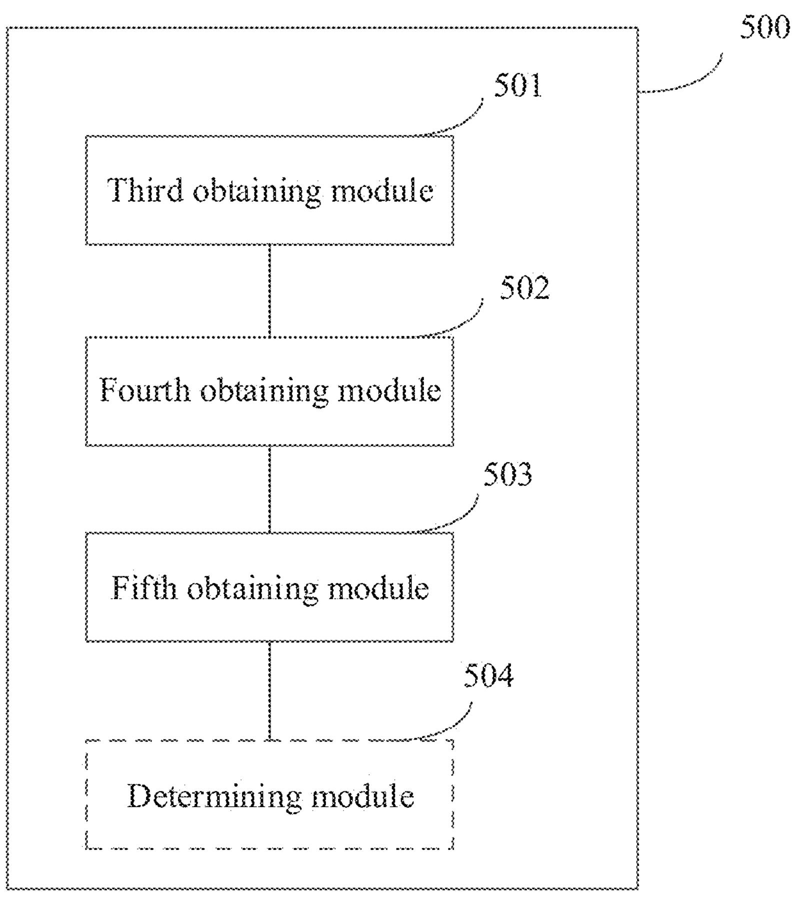
FIG. 5 is a diagram of a structure of an apparatus for obtaining a precoding matrix indicator according to an embodiment of this application.

FIG. 5 is a diagram of a structure of an apparatus for obtaining a precoding matrix indicator according to an embodiment of this application. As shown in FIG. 5, the apparatus 500 mainly includes: a third obtaining module 501, a fourth obtaining module 502, and a fifth obtaining module 503.

In this embodiment of this application, the third obtaining module 501 is configured to obtain a target codebook coefficient transmitted by a terminal; the fourth obtaining module 502 is configured to obtain a precoding matrix corresponding to the target codebook coefficient, where the precoding matrix is a precoding matrix jointly transmitted by a plurality of first TRPs; and the fifth obtaining module 503 is configured to obtain, based on the obtained precoding matrix, a precoding matrix indicator PMI corresponding to each first TRP.

In a possible implementation, the target codebook coefficient includes:

- a first codebook coefficient, where the first codebook coefficient is used for obtaining or indicating complex vectors corresponding to the plurality of first TRPs;
- a second codebook coefficient, where the second codebook coefficient is used for obtaining or indicating a projection coefficient of the precoding matrix; and
- a third codebook coefficient, where the third codebook coefficient is used for obtaining or indicating a first predetermined quantity of complex vectors of the precoding matrix.

In a possible implementation, the first codebook coefficient includes: T first coefficients and T second coefficients, where T is a quantity of TRPs comprised in the plurality of first TRPs, an i-th first coefficient indicates a number of an orthogonal beam group corresponding to an i-th first TRP, and an i-th second coefficient indicates numbers of a predetermined quantity of beams in the orthogonal beam group corresponding to the i-th first TRP, where i=1, 2, . . . , T.

In a possible implementation, the first codebook coefficient further includes: first indication information, where the first indication information indicates that the terminal does not recommend to use at least one second TRP for coordinated transmission, and the second TRP is a TRP other than the plurality of first TRPs in the plurality of TRPs.

In a possible implementation, the first indication information includes: N first coefficients and N second coefficients, where N is a quantity of TRPs included in the at least one second TRP, a value of a first coefficient corresponding to a j-th second TRP is a first predetermined value, and a value of a second coefficient corresponding to the j-th second TRP is a second predetermined value, where j=1, 2, . . . , N.

In a possible implementation, the first indication information includes: identification information of the at least one second TRP.

In a possible implementation, the first codebook coefficient is further used for indicating that the terminal recommends to use the plurality of first TRPs for coordinated transmission.

In a possible implementation, as shown in FIG. 5, the apparatus may further include: a determining module 504, configured to determine to use the plurality of first TRPs for coordinated transmission to the terminal.

In a possible implementation, the second codebook coefficient includes at least one of the following:

- a plurality of third coefficients, where each of the plurality of third coefficients is used for indicating positions and a quantity of non-zero coefficients of the plurality of first TRPs at a corresponding layer, or each of the plurality of third coefficients is used for indicating positions and a quantity of non-zero coefficients at one layer of the corresponding first TRP;
- a plurality of fourth coefficients, where each of the plurality of fourth coefficients is used for indicating a corresponding position of a strongest beam in the plurality of first TRPs at a corresponding layer in the projection coefficient;
- a plurality of fifth coefficients, where each of the plurality of fifth coefficients is used for indicating an amplitude ratio of a strongest coefficient among the plurality of first TRPs at a corresponding layer;
- a plurality of sixth coefficients, where each of the plurality of sixth coefficients is used for indicating an amplitude ratio of a strongest coefficient among feedback polarizations of the plurality of first TRPs at a corresponding layer, or each of the plurality of sixth coefficients is used for indicating an amplitude ratio of a strongest coefficient among feedback polarizations at one layer of the corresponding first TRPs;
- a plurality of seventh coefficients, where each of the plurality of seventh coefficients is used for indicating an amplitude of a strongest coefficient in a corresponding polarization of the plurality of first TRPs at a corresponding layer in the projection coefficient, or each of the plurality of seventh coefficients is used for indicating an amplitude of a coefficient of the corresponding first TRP at one layer; or
- a plurality of eighth coefficients, where each of the plurality of eighth coefficients is used for indicating a phase of a projection coefficient corresponding to the plurality of first TRPs at a corresponding layer, or each of the plurality of eighth coefficients is used for indicating a phase of a corresponding projection coefficient at one layer of the corresponding first TRP.

In a possible implementation, the third codebook coefficient includes at least one of the following:

- a ninth coefficient, used for indicating a start position of T fed-back windows in all tap positions, where T is a quantity of TRPs included in the plurality of first TRPs; or
- a tenth coefficient, used for indicating $M_v/T$ tap positions corresponding to each first TRP, where $M_v$ is the first predetermined quantity.

The apparatus for obtaining a precoding matrix indicator provided in this embodiment of this application can implement all processes implemented by the network-side device in the method embodiments shown in FIG. 2 and FIG. 3 and achieve same technical effects. Details are not described herein again to avoid repetition.

Figure 6:
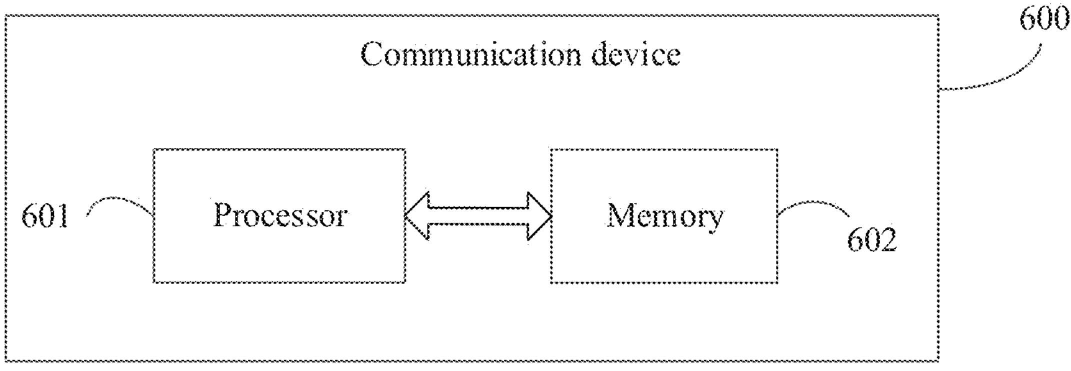
FIG. 6 is a diagram of a structure of a communication device according to an embodiment of this application.

Optionally, as shown in FIG. 6, an embodiment of this application further provides a communication device 600, including a processor 601 and a memory 602. The memory 602 stores a program or instructions executable on the processor 601. For example, when the communication device 600 is a terminal, and when the program or the instructions are executed by the processor 601, all steps of the precoding matrix feedback method in embodiments are implemented, and same technical effects can be achieved. When the communication device 600 is a network-side device, and when the program or the instructions are executable by the processor 601, all steps of the method for obtaining a precoding matrix indicator in embodiments are implemented, and same technical effects can be achieved. Details are not described herein again to avoid repetition.

Figure 7:
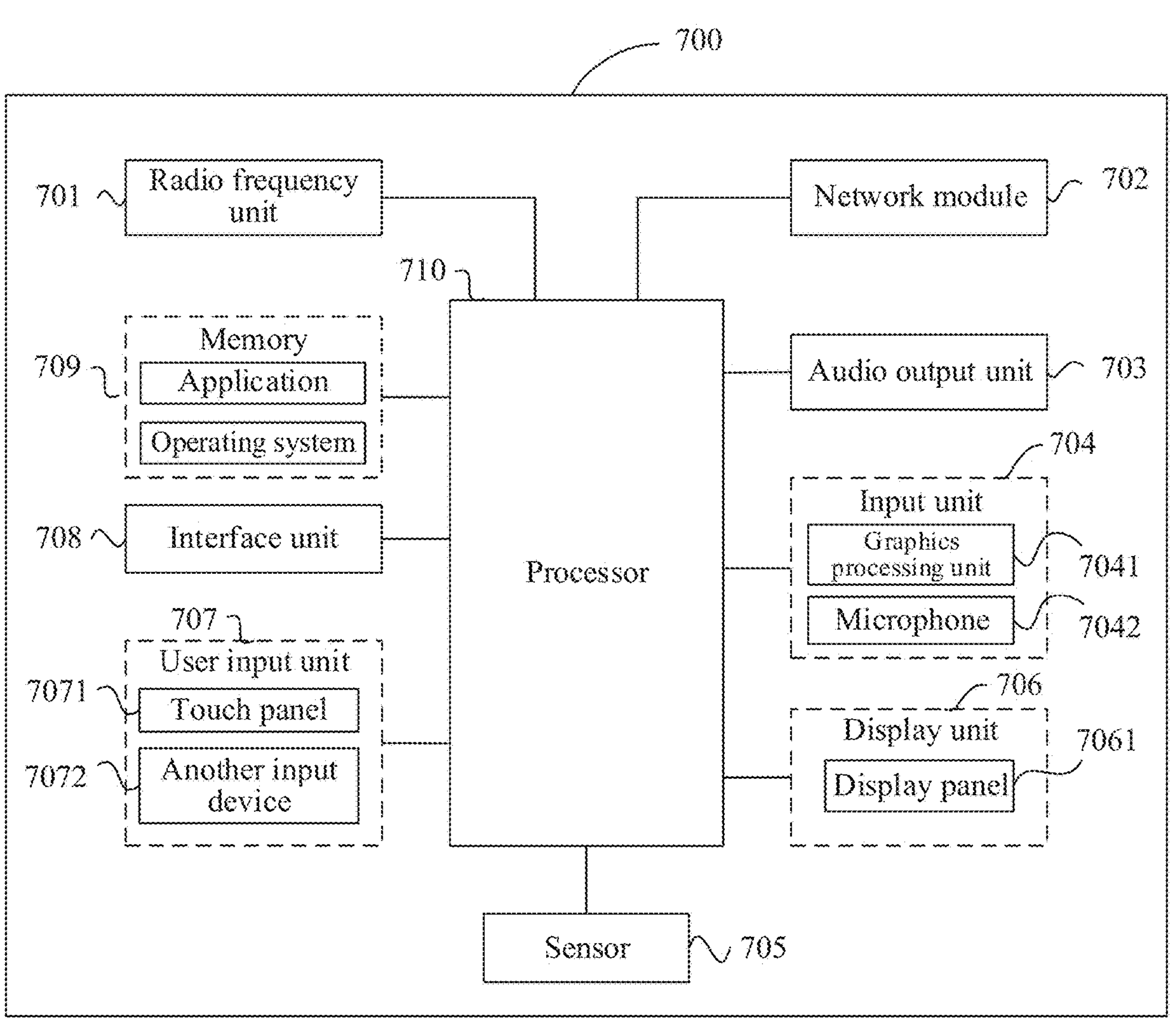
FIG. 7 is a diagram of a hardware structure of a terminal according to an embodiment of this application.

An embodiment of this application further provides a terminal, including a processor and a communication interface. The processor is configured to implement all steps of the precoding matrix feedback method in embodiments, and the communication interface is configured to communicate with an external device. The terminal embodiment corresponds to the terminal-side method embodiment described above, and each implementation process and implementation of the method embodiment described above may be used in the terminal embodiment, and the same technical effect can be achieved. Optionally, FIG. 7 is a diagram of a hardware structure of a terminal according to an embodiment of this application.

The terminal 700 includes, but is not limited to: at least some of components of a radio frequency unit 701, a network module 702, an audio output unit 703, an input unit 704, a sensor 705, a display unit 706, a user input unit 707, an interface unit 708, a memory 709, a processor 710, and the like.

A person skilled in the art may understand that, the terminal 700 may further include a power supply (for example, a battery) for supplying power to the components. The power supply may be logically connected to the processor 710 by using a power management system, to implement functions such as charging, discharging, and power consumption management by using the power management system. The structure of the terminal shown in FIG. 7 constitutes no limitation on the terminal. The terminal may include more or fewer components than those shown in the figure, or combine some components, or have different component arrangements. Details are not described herein again.

It should be understood that, in this embodiment of this application, the input unit 704 may include a graphics processing unit (GPU) 7041 and a microphone 7042. The graphics processing unit 7041 performs processing on image data of a static image or a video that is obtained by an image capture apparatus (for example, a camera) in a video capture mode or an image capture mode. The display unit 706 may include a display panel 7061, and the display panel 7061 may be configured in a form of a liquid crystal display, an organic light-emitting diode, or the like. The user input unit 707 includes at least one of a touch panel 7071 or another input device 7072. The touch panel 7071 is also referred to as a touchscreen. The touch panel 7071 may include two parts: a touch detection apparatus and a touch controller. The another input device 7072 may include, but is not limited to, a physical keyboard, a function button (such as a volume control button or a power button), a trackball, a mouse, and a joystick. Details are not described herein again.

In this embodiment of this application, after receiving downlink data from the network-side device, the radio frequency unit 701 may transmit the downlink data to the processor 710 for processing. In addition, the radio frequency unit 701 may send uplink data to the network-side device. Generally, the radio frequency unit 701 includes, but is not limited to, an antenna, an amplifier, a transceiver, a coupler, a low noise amplifier, a duplexer, and the like.

The memory 709 may be configured to store a software program or instructions and various data. The memory 709 may mainly include a first storage area for storing the program and the instructions and a second storage area for storing the data. The first storage area may store an operating system, an application or instructions required by at least one function (for example, a sound playback function, an image display function, and the like), and the like. In addition, the memory 709 may include a volatile memory or a non-volatile memory, or the memory 709 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 709 in this embodiment of this application includes, but is not limited to, these memories and any memory of another proper type.

The processor 710 may include one or more processing units. Optionally, the processor 710 integrates an application processor and a modem processor. The application processor mainly processes an operation related to an operating system, a user interface, an application, and the like, and the modem processor mainly processes a wireless communication signal, for example, a baseband processor. It may be understood that, the foregoing modem processor may not be integrated into the processor 710.

The processor 710 is configured to measure channel reference signals transmitted by a plurality of TRPs; obtain, based on a channel reference signal measurement result, a precoding matrix jointly transmitted by a plurality of first TRPs, where the first TRPs are TRPs in the plurality of TRPs; and obtain a target codebook coefficient of the precoding matrix, where the target codebook coefficient is used for obtaining or indicating the precoding matrix.

The radio frequency unit 701 is configured to transmit the target codebook coefficient of the precoding matrix to a network-side device.

An embodiment of this application further provides a network-side device, including a processor and a communication interface. The processor is configured to implement all steps of the method for obtaining a precoding matrix indicator, and the communication interface is configured to communicate with an external device. The network-side device embodiment corresponds to the network-side device method embodiment, and each implementation process and implementation of the method embodiment described above may be used in the network-side device embodiment, and the same technical effect can be achieved.

Figure 8:
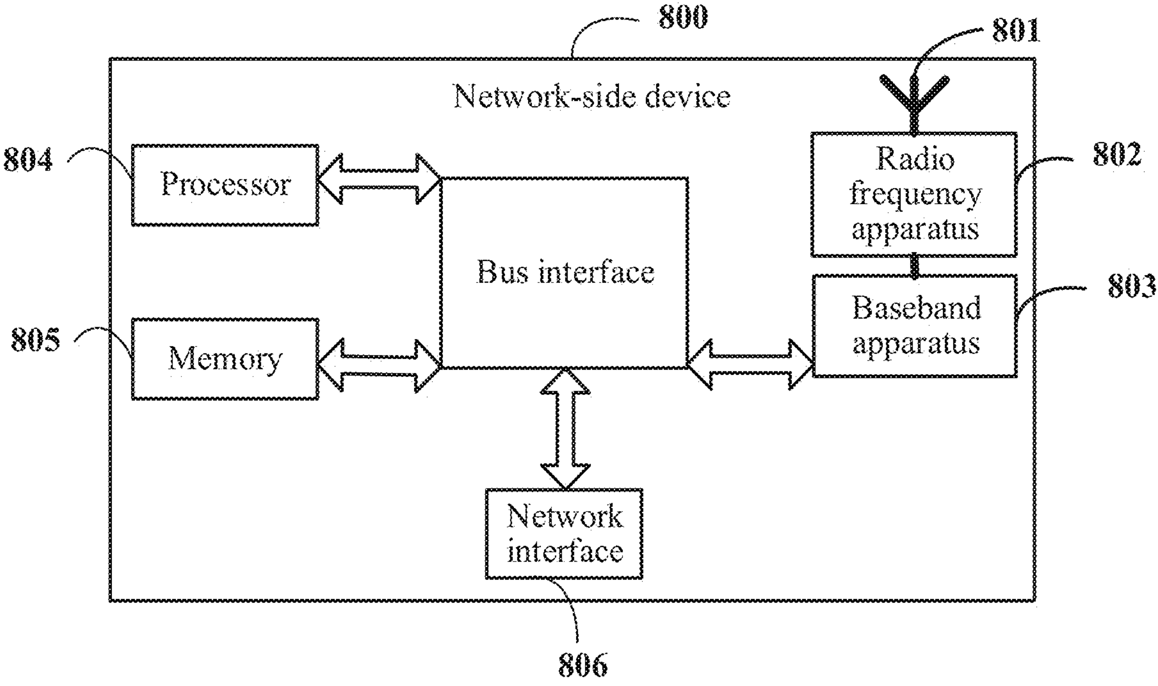
FIG. 8 is a diagram of a hardware structure of a network-side device according to an embodiment of this application.

Optionally, an embodiment of this application further provides a network-side device. As shown in FIG. 8, the network-side device 800 includes: an antenna 801, a radio frequency apparatus 802, a baseband apparatus 803, a processor 804, and a memory 805. The antenna 801 is connected to the radio frequency apparatus 802. In an uplink direction, the radio frequency apparatus 802 receives information through the antenna 801 and sends the received information to the baseband apparatus 803 for processing. In a downlink direction, the baseband apparatus 803 processes to-be-sent information and sends the information to the radio frequency apparatus 802, and the radio frequency apparatus 802 processes the received information and sends the information through the antenna 801.

The method performed by the network-side device in the foregoing embodiment may be implemented in the baseband apparatus 803. The baseband apparatus 803 includes a baseband processor.

The baseband apparatus 803 may include, for example, at least one baseband board, and a plurality of chips are disposed on the baseband board. As shown in FIG. 8, one of the chips is, for example, the baseband processor, connected to the memory 805 through a bus interface, to invoke a program in the memory 805, to perform an operation performed by the network device shown in the foregoing method embodiment.

The network-side device may further include a network interface 806. The interface is, for example, a common public radio interface (CPRI).

Optionally, the network-side device 800 in this embodiment of the present application further includes: instructions or a program stored in the memory 805 and run on the processor 804. The processor 804 invokes the instructions or the program in the memory 805, to perform the methods performed by the modules shown in FIG. 5, and same technical effects are achieved. Details are not described herein again to avoid repetition.

An embodiment of this application further provides a non-transitory readable storage medium. The non-transitory readable storage medium stores a program or instructions. When the program or the instructions are executed by a processor, all processes of the precoding matrix feedback method in embodiments are implemented, or all processes of the method for obtaining a precoding matrix indicator are implemented, and same technical effects can be achieved. Details are not described herein again to avoid repetition.

The processor is the processor in the terminal described in the foregoing embodiment. The non-transitory readable storage medium includes a non-transitory computer-readable storage medium, for example, a computer read only memory ROM, a random access memory RAM, a magnetic or an optical disc, and the like.

An embodiment of this application further provides a chip. The chip includes a processor and a communication interface. The communication interface is coupled to the processor. The processor is configured to run a program or instructions, to implement all processes of the precoding matrix feedback method in embodiments, or implement all processes of the method for obtaining a precoding matrix indicator in embodiments, and same technical effects can be achieved. Details are not described herein again to avoid repetition.

It should be understood that, the chip in this embodiment of this application may alternatively be referred to as a system-level chip, a system chip, a chip system, a system-on-chip, or the like.

An embodiment of this application further provides a computer program/program product. The computer program/program product is stored in a non-transitory storage medium. The computer program/program product is executed by at least one processor, to implement all processes of the precoding matrix feedback method in embodiments, or implement all processes of the method for obtaining a precoding matrix indicator in embodiments, and same technical effects can be achieved. Details are not described herein again to avoid repetition.

An embodiment of this application further provides a precoding matrix feedback system, including: a terminal and a network-side device. The terminal may be configured to perform steps of the precoding matrix feedback method as described above, and the network-side device may be configured to perform steps of the method for obtaining a precoding matrix indicator as described above.

It should be noted that, the terms "include", "comprise", or any other variation thereof in this specification is intended to cover a non-exclusive inclusion, so that a process, a method, an article, or an apparatus that includes a list of elements not only includes those elements but also includes other elements that are not expressly listed, or further includes elements inherent to such a process, a method, an article, or an apparatus. An element preceded by "includes a" does not, without more constraints, preclude the presence of additional identical elements in the process, the method, the article, or the apparatus that includes the element. In addition, it should be noted that, scopes of the method and the apparatus in the implementations of this application are not limited to performing functions in an order shown or discussed, but may include performing functions in a substantially concurrent manner or in reverse order depending on functionality involved. For example, the methods described may be performed in an order different from that described, and various steps may alternatively be added, omitted, or combined. In addition, characteristics described with reference to some examples may alternatively be combined in other examples.

Based on the descriptions of the foregoing implementations, a person skilled in the art may clearly understand that the method according to the foregoing embodiment may be implemented by software in addition to necessary universal hardware platform, or by using hardware. Based on such an understanding, the technical solutions of this application essentially, or the part contributing to the conventional technology, may be presented in a form of a computer software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in embodiments of this application.

Embodiments of this application are described with reference to the accompanying drawings. This application is not limited to the implementations described above, and the implementations described above are merely examples and not limited. A person of ordinary skill in the art may also make various variations under the inspiration of this application and without departing from the purpose of this application and the protection scope of the claims, and such variations shall all fall within the protection scope of this application.

What is claimed is:

1. A precoding matrix feedback method, comprising:

measuring, by a terminal, channel reference signals transmitted by a plurality of transmission reception points (TRPs);

obtaining, by the terminal based on a channel reference signal measurement result, a precoding matrix jointly transmitted by a plurality of first TRPs, wherein the first TRPs are TRPs in the plurality of TRPs;

obtaining, by the terminal, a target codebook coefficient of the precoding matrix, wherein the target codebook coefficient is used for obtaining or indicating the precoding matrix; and transmitting, by the terminal, the target codebook coefficient of the precoding matrix to a network-side device.

2. The method according to claim 1, wherein the target codebook coefficient comprises:

a first codebook coefficient, wherein the first codebook coefficient is used for obtaining or indicating beam complex vectors corresponding to the plurality of first TRPs.

3. The method according to claim 2, wherein the first codebook coefficient comprises: T first coefficients and T second coefficients, wherein T is a quantity of TRPs comprised in the plurality of first TRPs, an i-th first coefficient indicates a number of an orthogonal beam group corresponding to an i-th first TRP, and an i-th second coefficient indicates numbers of a predetermined quantity of beams in the orthogonal beam group corresponding to the i-th first TRP, wherein i=1, 2, . . . , T.

4. The method according to claim 1, wherein the transmitting, by the terminal, the target codebook coefficient of the precoding matrix to a network-side device comprises:

transmitting, by the terminal, the target codebook coefficient of the precoding matrix by using a multi-TRP (MTRP) channel state information (CSI) report, wherein the MTRP CSI report further comprises a target bit sequence, and the target bit sequence is used to indicate the first TRPs.

5. The method according to claim 4, further comprising: obtaining, by the terminal, higher layer signaling; wherein in a case that the higher layer signaling indicates that the terminal is not allowed to select a TRP, the target codebook coefficient of the precoding matrix is a target codebook coefficient corresponding to the plurality of TRPs.

6. The method according to claim 5, wherein in a case that the higher layer signaling indicates that the terminal is allowed to select a TRP, the target codebook coefficient of the precoding matrix is a target codebook coefficient corresponding to selected TRP of the terminal.

7. The method according to claim 2, wherein the target codebook coefficient further comprises:

a plurality of third coefficients, wherein each of the plurality of third coefficients is used for indicating positions and a quantity of non-zero coefficients at one layer of a corresponding first TRP.

8. A method for obtaining a precoding matrix indicator, comprising:

obtaining, by a network-side device, a target codebook coefficient transmitted by a terminal;

obtaining, by the network-side device, a precoding matrix corresponding to the target codebook coefficient, wherein the precoding matrix is a precoding matrix jointly transmitted by a plurality of first transmission reception points (TRPs); and obtaining, by the network-side device based on the obtained precoding matrix, a precoding matrix indicator (PMI) corresponding to each first TRP.

9. The method according to claim 8, wherein the target codebook coefficient comprises:

a first codebook coefficient, wherein the first codebook coefficient is used for obtaining or indicating complex vectors corresponding to the plurality of first TRPs.

10. The method according to claim 9, wherein the first codebook coefficient comprises: T first coefficients and T second coefficients, wherein T is a quantity of TRPs comprised in the plurality of first TRPs, an i-th first coefficient indicates a number of an orthogonal beam group corresponding to an i-th first TRP, and an i-th second coefficient indicates numbers of a predetermined quantity of beams in the orthogonal beam group corresponding to the i-th first TRP, wherein i=1, 2, . . . , T.

11. The method according to claim 8, wherein the obtaining, by a network-side device, a target codebook coefficient transmitted by a terminal comprises:

obtaining, by the network-side device, the target codebook coefficient by using a multi-TRP (MTRP) channel state information (CSI) report, wherein the MTRP CSI report further comprises a target bit sequence, and the target bit sequence is used to indicate the first TRPs.

12. The method according to claim 11, further comprising:

indicating, by the network-side device, higher layer signaling to the terminal; wherein in a case that the higher layer signaling indicates that the terminal is not allowed to select a TRP, the target codebook coefficient of the precoding matrix is a target codebook coefficient corresponding to the plurality of TRPs.

13. The method according to claim 12, wherein in a case that the higher layer signaling indicates that the terminal is allowed to select a TRP, the target codebook coefficient of the precoding matrix is a target codebook coefficient corresponding to selected TRP of the terminal.

14. A network-side device, comprising a processor and a memory, wherein the memory stores a program or instructions executable on the processor, and when the program or the instructions are executed by the processor, steps of the method for obtaining a precoding matrix indicator according to claim 8 are implemented.

15. A terminal, comprising a processor and a memory, wherein the memory stores a program or instructions executable on the processor, and the program or the instructions, when executed by the processor, cause the terminal to perform:

measuring channel reference signals transmitted by a plurality of transmission reception points (TRPs);

obtaining, based on a channel reference signal measurement result, a precoding matrix jointly transmitted by a plurality of first TRPs, wherein the first TRPs are TRPs in the plurality of TRPs;

obtaining a target codebook coefficient of the precoding matrix, wherein the target codebook coefficient is used for obtaining or indicating the precoding matrix; and transmitting the target codebook coefficient of the precoding matrix to a network-side device.

16. The terminal according to claim 15, wherein the target codebook coefficient comprises:

a first codebook coefficient, wherein the first codebook coefficient is used for obtaining or indicating beam complex vectors corresponding to the plurality of first TRPs.

17. The terminal according to claim 16, wherein the first codebook coefficient comprises: T first coefficients and T second coefficients, wherein T is a quantity of TRPs comprised in the plurality of first TRPs, an i-th first coefficient indicates a number of an orthogonal beam group corresponding to an i-th first TRP, and an i-th second coefficient indicates numbers of a predetermined quantity of beams in the orthogonal beam group corresponding to the i-th first TRP, wherein i=1, 2, . . . , T.

18. The terminal according to claim 15, wherein the program or the instructions, when executed by the processor, cause the terminal to perform:

transmitting the target codebook coefficient of the precoding matrix by using a multi-TRP (MTRP) channel state information (CSI) report, wherein the MTRP CSI report further comprises a target bit sequence, and the target bit sequence is used to indicate the first TRPs.

19. The terminal according to claim 18, wherein the program or the instructions, when executed by the processor, cause the terminal to further perform:

obtaining higher layer signaling; wherein in a case that the higher layer signaling indicates that the terminal is not allowed to select a TRP, the target codebook coefficient of the precoding matrix is a target codebook coefficient corresponding to the plurality of TRPs.

20. The terminal according to claim 19, wherein in a case that the higher layer signaling indicates that the terminal is allowed to select a TRP, the target codebook coefficient of the precoding matrix is a target codebook coefficient corresponding to selected TRP of the terminal.

* * * * *